United States Patent
Mukai et al.

(10) Patent No.: US 10,974,207 B2
(45) Date of Patent: Apr. 13, 2021

(54) GAS SEPARATION MEMBRANE, GAS SEPARATION MEMBRANE MODULE, AND GAS SEPARATION DEVICE

(71) Applicant: FUJIFILM Corporation, Tokyo (JP)

(72) Inventors: Atsushi Mukai, Kanagawa (JP); Yusuke Mochizuki, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 209 days.

(21) Appl. No.: 16/202,103

(22) Filed: Nov. 28, 2018

(65) Prior Publication Data

US 2019/0091635 A1 Mar. 28, 2019

Related U.S. Application Data

(63) Continuation of application No. PCT/JP2017/026428, filed on Jul. 21, 2017.

(30) Foreign Application Priority Data

Aug. 8, 2016 (JP) .............................. JP2016-155957

(51) Int. Cl.
*B01D 69/12* (2006.01)
*B01D 71/32* (2006.01)
(Continued)

(52) U.S. Cl.
CPC ........... *B01D 69/12* (2013.01); *B01D 53/228* (2013.01); *B01D 69/10* (2013.01); *B01D 71/32* (2013.01);
(Continued)

(58) Field of Classification Search
None
See application file for complete search history.

(56) References Cited

U.S. PATENT DOCUMENTS 4,813,983 A * 3/1989 Nohmi ................... B01D 69/12
428/378
5,286,280 A * 2/1994 Chiou .................. B01D 53/228
427/412.1
(Continued)

FOREIGN PATENT DOCUMENTS

JP 2004017002 1/2004
JP 2005511669 4/2005
(Continued)

OTHER PUBLICATIONS

"International Search Report (Form PCT/ISA/210) of PCT/JP2017/026428," dated Oct. 3, 2017, with English translation thereof, pp. 1-5.
(Continued)

*Primary Examiner* — Jason M Greene
(74) *Attorney, Agent, or Firm* — JCIPRNET

(57) ABSTRACT

A gas separation membrane, the gas separation membrane module, and the gas separation device each have a support, a resin layer, a separation layer, and a protective layer in this order, in which the resin layer includes a compound having a siloxane bond, the protective layer is in direct contact with the separation layer, a composition of the protective layer is different from a composition of the resin layer, the composition of the protective layer is different from a composition of the separation layer, and the separation layer has a maximum value of a silicon atom content of 2 atomic % or less in a composition of a half area on a side of the protective layer in a thickness direction.

20 Claims, 2 Drawing Sheets

(51) Int. Cl.
  *B01D 69/10* (2006.01)
  *B01D 53/22* (2006.01)
  *B01D 71/64* (2006.01)
  *B01D 71/70* (2006.01)

(52) U.S. Cl.
  CPC .............. *B01D 71/64* (2013.01); *B01D 71/70* (2013.01); *B01D 2256/10* (2013.01); *B01D 2256/16* (2013.01); *B01D 2256/20* (2013.01); *B01D 2256/24* (2013.01); *B01D 2256/245* (2013.01); *B01D 2257/302* (2013.01); *B01D 2257/304* (2013.01); *B01D 2257/308* (2013.01); *B01D 2257/404* (2013.01); *B01D 2257/504* (2013.01); *B01D 2258/05* (2013.01)

(56) References Cited

U.S. PATENT DOCUMENTS

| | | |
|---|---|---|
| 2003/0104931 A1 | 6/2003 | Mertens et al. |
| 2008/0241060 A1 | 10/2008 | Li et al. |
| 2015/0165384 A1 | 6/2015 | Aburaya |
| 2015/0190762 A1* | 7/2015 | Van Kessel .......... B01D 69/127 96/12 |
| 2016/0166993 A1* | 6/2016 | Lee .......... B01D 69/12 210/321.6 |
| 2016/0354731 A1 | 12/2016 | Mochizuki |

FOREIGN PATENT DOCUMENTS

| | | |
|---|---|---|
| JP | 2011167690 | 9/2011 |
| JP | 2012091997 | 5/2012 |
| JP | 2014079751 | 5/2014 |
| JP | 2016041415 | 3/2016 |
| WO | 2015129786 | 9/2015 |

OTHER PUBLICATIONS

"Written Opinion of the International Searching Authority (Form PCT/ISA/237) of PCT/JP2017/026428," dated Oct. 3, 2017, with English translation thereof, pp. 1-15.

* cited by examiner

GAS SEPARATION MEMBRANE, GAS SEPARATION MEMBRANE MODULE, AND GAS SEPARATION DEVICE

CROSS-REFERENCE TO RELATED APPLICATIONS

This application is a Continuation of PCT International Application No. PCT/JP2017/026428 filed on Jul. 21, 2017, which claims priority under 35 U.S.C. § 119(a) to Japanese Patent Application No. 2016-155957, filed on Aug. 8, 2016. Each of the above application(s) is hereby expressly incorporated by reference, in its entirety, into the present application.

BACKGROUND OF THE INVENTION

1. Field of the Invention

The present invention relates to a gas separation membrane, a gas separation membrane module, and a gas separation device.

2. Description of the Related Art

A material formed of a polymer compound has a gas permeability specific to the material. Based on this property, a gas separation membrane allows selective permeation and separation of a target gas component using a membrane formed of a specific polymer compound. As an industrial use aspect of this gas separation membrane, in relation to a global warming issue, a study has been conducted for separating and recovering carbon dioxide from a large-scale carbon dioxide source in a thermal power station, a cement plant, a blast furnace in a steel plant or the like. Further, this membrane separation technique has been attracting attention as means for solving environmental issues which can be achieved with relatively little energy. In addition, the technique is used as means for removing carbon dioxide from natural gas mainly including methane and carbon dioxide or biogas (gas generated due to fermentation and anaerobic digestion of biological excrement, organic fertilizers, biodegradable substances, sewage, garbage, energy crops, or the like).

The following methods are known to secure gas permeability and gas separation selectivity by making a site contributing to gas separation into a thin layer to be used as a practical gas separation membrane. A method of making a portion contributing to separation serving as an asymmetric membrane into a thin layer which is referred to as a skin layer, a method of using a thin layer composite membrane (thin film composite) provided with a thin film layer (selective layer) contributing to gas separation on a support having mechanical strength, or a method of using hollow fibers including a layer which contributes to gas separation and has high density is known.

For example, JP2016-041415A discloses an acidic gas separation module including an acidic gas separation membrane having a porous support, an interlayer which is formed on the porous support, a carrier which is formed on the interlayer and reacts with an acidic gas, and a facilitated transport membrane which contains a hydrophilic compound for supporting the carrier, and a member for a supply gas flow path which becomes a flow path for a raw material gas, in which the interlayer has an area on the support which is positioned on the porous support and a penetration area inside the porous support, Tb/Ta, as a ratio between a thickness Ta of the area on the support and a thickness Tb of the penetration area, is 0.1 to 100, and further, gas permeability is 500 Barrer or higher.

SUMMARY OF THE INVENTION

In the example of JP2016-041415A, a gas separation membrane in which polydimethylsiloxane is used for an interlayer is described. In particular, in Example 9 of JP2016-041415A, a gas separation membrane in which the same polydimethylsiloxane as the interlayer is used for a protective layer is described.

As a result of examination on the performance of the gas separation membrane described in the example of JP2016-041415A conducted by the present inventors, the present inventors have found that the separation selectivity of methane and carbon dioxide is good, but in a case where a plurality of samples of gas separation membranes are prepared, variation occurs in separation selectivity of propane and carbon dioxide (hereinafter, referred to as C3 gas separation selectivity) for each sample.

Therefore, in a case where propane gas is contained in the gas to be separated, there is room for suppressing variation in C3 gas separation selectivity. In a case where the gas separation membrane is implemented in the real gas fields, impurity gas compositions are different in each gas field. Thus, in a case where propane is contained in the impurity gas, a difference in performance of gas separation selectivity is generated and thus it is necessary to prepare a plurality of samples of gas separation membranes and select only samples exhibiting good performance. Thus, there is room for improvement from the viewpoint of the production cost.

As described above, in fact, a gas separation membrane which has a small variation in C3 gas separation selectivity has not been known yet.

An object of the present invention is to provide a gas separation membrane which has a small variation in C3 gas separation selectivity.

Another object of the present invention is to provide a gas separation membrane module having a gas separation membrane which has a small variation in C3 gas separation selectivity.

Still another object of the present invention is to provide a gas separation device having a gas separation membrane module having a gas separation membrane which has a small variation in C3 gas separation selectivity.

As a result of intensive examination conducted by the present inventors, it has been found that by laminating a resin layer including a compound having a siloxane bond, a separation layer in which a maximum value of a silicon atom content in a composition of a half area on a protective layer side in a thickness direction is in a predetermined range or less, and a protective layer whose composition is different from compositions of the resin layer and the separation layer in this order, a gas separation membrane which has a small variation in C3 gas separation selectivity can be obtained.

The present invention which is specific means for solving the above-described problems and preferable aspects of the present invention are as follows.

[1] A gas separation membrane comprising, in order: a support; a resin layer; a separation layer; and a protective layer, in which the resin layer includes a compound having a siloxane bond, the protective layer is in direct contact with the separation layer, a composition of the protective layer is different from a composition of the resin layer, the composition of the protective layer is different from a composition of the separation layer, and the separation layer has a maximum value of a silicon atom content of 2 atomic % or less in a composition of a half area on a side of the protective layer in a thickness direction.

[2] In the gas separation membrane according to [1], it is preferable that the protective layer has a silicon atom content of 5 atomic % or less.

[3] In the gas separation membrane according to [1] or [2], it is preferable that 90 atomic % or more of the composition of the protective layer is constituted of a carbon atom, a hydrogen atom, a nitrogen atom, and an oxygen atom.

[4] In the gas separation membrane according to any one of [1] to [3], it is preferable that 90 atomic % or more of the composition of the protective layer is constituted of a carbon atom, a hydrogen atom, a nitrogen atom, an oxygen atom, and a halogen atom.

[5] In the gas separation membrane according to [4], it is preferable that the halogen atom is a fluorine atom, and a fluorine atom content in the composition of the protective layer is 10 atomic % or more.

[6] In the gas separation membrane according to any one of [1] to [5], it is preferable that the protective layer includes a resin, and the protective layer includes at least one selected from the group of a fluoro(meth)acrylate polymer and a fluoroolefin polymer as the resin of the protective layer.

[7] In the gas separation membrane according to any one of [1] to [6], it is preferable that the protective layer includes a resin, and the resin of the protective layer includes at least one selected from the group of an acrylic ester bond, a methacrylic ester bond, a urethane bond, and an ether bond.

[8] In the gas separation membrane according to any one of [1] to [7], it is preferable that the protective layer has a thickness of 20 to 200 nm.

[9] In the gas separation membrane according to any one of [1] to [8], it is preferable that the protective layer is insoluble in an organic solvent consisting of toluene and heptane at a compositional ratio of 1:1 by mass ratio.

[10] In the gas separation membrane according to any one of [1] to [9], it is preferable that the compound having a siloxane bond of the resin layer is polydimethylsiloxane.

[11] In the gas separation membrane according to any one of [1] to [10], it is preferable that the separation layer includes a resin, and the resin of the separation layer is polyimide.

[12] It is preferable that the gas separation membrane according to any one of [1] to [11] further comprises a second protective layer, in which the support, the resin layer, the separation layer, the protective layer, and the second protective layer are provided in this order, and the second protective layer includes a compound having a siloxane bond.

[13] In the gas separation membrane according to [12], it is preferable that the compound having a siloxane bond of the second protective layer is polydimethylsiloxane.

[14] A gas separation membrane module comprising: the gas separation membrane according to any one of [1] to [13].

[15] A gas separation device comprising: the gas separation membrane module according to [14].

According to the present invention, it is possible to provide a gas separation membrane which has a small variation in C3 gas separation selectivity.

DESCRIPTION OF THE PREFERRED EMBODIMENTS

Figure 1:
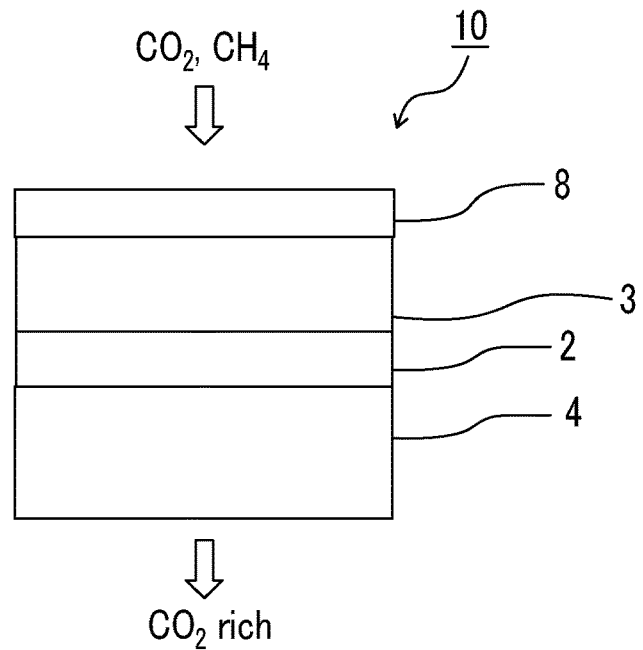
FIG. 1 is a schematic view showing an example of a gas separation membrane according to the present invention.

Hereinafter, the present invention will be described in detail. The description of the constitutional requirements described below is made on the basis of representative embodiments of the present invention, but it should be construed that the present invention is not limited to those embodiments. In the present specification, numerical value ranges expressed by the term "to" mean that the numerical values described before and after "to" are included as a lower limit and an upper limit, respectively.

In the present specification, when a plurality of substituents or linking groups (hereinafter, referred to as substituents or the like) shown by specific symbols are present or a plurality of substituents are defined simultaneously or alternatively, this means that the respective substituents may be the same as or different from each other. In addition, even in a case where not specifically stated, when a plurality of substituents or the like are adjacent to each other, the substituents may be condensed or linked to each other and form a ring.

In regard to compounds (including resins) described in the present specification, the description includes salts thereof and ions thereof in addition to the compounds. Further, the description includes derivatives formed by changing a predetermined part within the range in which desired effects are exhibited.

A substituent (the same applies to a linking group) in the present specification may have an optional substituent of the group within the range in which desired effects are exhibited. The same applies to a compound in which substitution or non-substitution is not specified.

The term "(meth)acryl" means both acryl and methacryl. The term "(meth)acrylate means both acrylate and methacrylate.

[Gas Separation Membrane]

A gas separation membrane according to an embodiment of the present invention includes a support, a resin layer, a separation layer, and a protective layer in this order, in which the resin layer includes a compound having a siloxane bond, the protective layer is in direct contact with the separation layer, a composition of the protective layer is different from a composition of the resin layer, the composition of the protective layer is different from a composition of the separation layer, and the separation layer has a maximum value of a silicon atom content of 2 atomic % or less in a composition of a half area on a protective layer side in a thickness direction.

By adopting such a configuration, it is possible to provide a gas separation membrane which has a small variation in C3 gas separation selectivity.

In Example 9 of JP2016-41415A, the resin layer (interlayer) including a curing type polydimethylsiloxane and the protective layer are disposed above and under the separation layer. The present inventors have conducted examination on the gas separation membrane having this configuration and have found that the remaining polydimethylsiloxane oligomers or monomers diffuse or segregate into the separation layer (the side of the separation layer opposite to the resin layer) during a lamination process or stationary heating. Further, it has been found that a penetrating (segregated) portion of polydimethylsiloxane may be formed in the separation layer in some cases.

Also, in a gas separation membrane having a configuration in which only the resin layer including polydimethylsiloxane and the separation layer are laminated without providing the protective layer, it has been found that the resin layer including polydimethylsiloxane segregates on the side of the separation layer opposite to the resin layer. Further, it has been found that a penetrating (segregated) portion of polydimethylsiloxane may be formed in the separation layer in some cases.

In contrast, the present inventors have newly found that by forming the separation layer and a layer to be in contact with at least one side of the separation layer to have different compositions from each other, the segregation amount of the component (particularly, the compound having a siloxane bond) of the resin layer on the side of the separation layer opposite to the resin layer can be made almost zero. In the present invention, by utilizing this founding, it is possible to suppress a problem that a penetrating (segregated) portion may be formed in the separation layer in some cases.

Further, in the preferable embodiment of the gas separation membrane of the present invention, it is preferable that the rub resistance (film hardness) of the gas separation membrane is high.

Further, according to the preferable embodiment of the present invention, it is possible to solve a problem of lowering of adhesion between the separation layer and the protective layer caused by segregation of the component of the resin layer such as polydimethylsiloxane on the side of the separation layer opposite to the resin layer.

Further, in the preferable embodiment of the gas separation membrane of the present invention, it is preferable that the gas permeability ($CO_2$ permeability) of the gas separation membrane is also high.

Further, in the preferable embodiment of the gas separation membrane of the present invention, it is preferable that toluene separation selectivity is also high.

In the present specification, the separation layer indicates a layer having a separation selectivity. A layer having a separation selectivity indicates a layer in which a ratio ($P_{CO2}/P_{CH4}$) of a permeability coefficient ($P_{CO2}$) of carbon dioxide to a permeability coefficient ($P_{CH4}$) of methane, in a case where a membrane having a thickness of 0.05 to 30 µm is formed and pure gas of carbon dioxide ($CO_2$) and methane ($CH_4$) is supplied to the obtained membrane at a temperature of 40° C. by setting the total pressure of the gas supply side to 0.5 MPa, is 1.5 or greater.

Hereinafter, preferable embodiments of the gas separation membrane of the present invention will be described.

<Configuration>

It is preferable that the gas separation membrane according to the embodiment of the present invention is a thin layer composite membrane (also referred to as a gas separation composite membrane) or an asymmetric membrane or is formed of hollow fibers. Among these, a thin layer composite membrane is more preferable.

Hereinafter, a case where the gas separation membrane is a thin layer composite membrane will be described as a typical example, but the gas separation membrane according to the embodiment of the present invention is not limited to this thin layer composite membrane.

The preferable configurations of the gas separation membrane according to the embodiment of the present invention will be described with reference to the accompanying drawings. An example of a gas separation membrane 10 shown in FIG. 1 is a thin layer composite membrane and the gas separation membrane 10 includes a support 4, a resin layer 2, a separation layer 3, and a protective layer 8 in this order.

Figure 2:
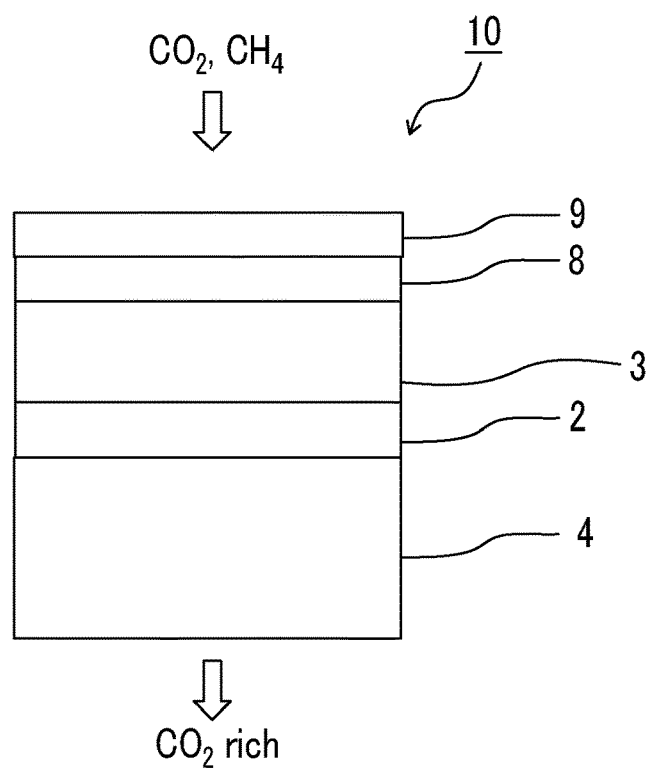
FIG. 2 is a schematic view showing another example of the gas separation membrane according to the present invention.

Another example of the gas separation membrane 10 shown in FIG. 2 is the gas separation membrane 10 having the support 4, the resin layer 2, the separation layer 3, the protective layer 8, and a second protective layer 9 in this order.

Figure 3:
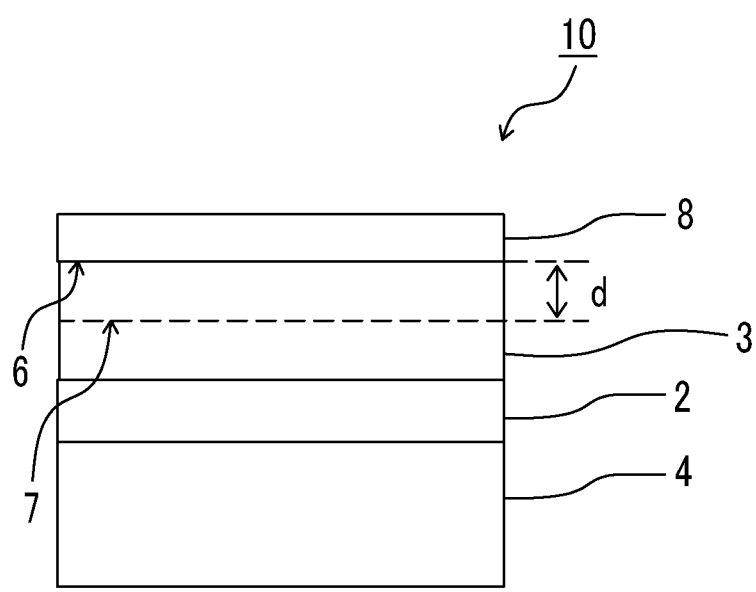
FIG. 3 is a schematic view for illustrating a half area of a separation layer on the protective layer side in an example of the gas separation membrane according to the present invention.

In the gas separation membrane according to the embodiment of the present invention, the separation layer has a maximum value of a silicon atom content of 2 atomic % or less in the composition of the half area on the protective layer side in the thickness direction. FIG. 3 shows a schematic view for illustrating the half area of the separation layer on the protective layer side in an example of the gas separation membrane according to the present invention. In the gas separation membrane 10 shown in FIG. 3, an area from an interface 6 between the separation layer and the protective layer to a half 7 of the separation layer on the protective layer side is a half area d of the separation layer on the protective layer side in the thickness direction.

The expression "on the support" in the present specification means that another layer may be interposed between the support and a layer having separation selectivity. Further, in regard to the expressions related to up and down, the direction in which a gas to be separated is supplied to is set as "up" and the direction in which the separated gas is discharged is set as "down" as shown in FIG. 1 unless otherwise specified.

In the gas separation membrane according to the embodiment of the present invention, as shown in FIGS. 1 and 2, the protective layer is disposed closer to a side to which a gas is supplied than to the separation layer.

As shown in FIG. 2, in the gas separation membrane, it is preferable that the second protective layer 9 is in direct contact with the protective layer 8 and the second protective layer 9 is disposed close to the side to which a gas is supplied than to the protective layer 8.

<Support>

The gas separation membrane according to the embodiment of the present invention has a support.

It is preferable that the support is thin and is formed of a porous material from the viewpoint of securing the gas permeability sufficiently.

The gas separation membrane according to the embodiment of the present invention may be obtained by forming or disposing the separation layer 3 on or in the surface of the porous support or may be a thin layer composite membrane conveniently obtained by forming the separation layer on the surface thereof. In a case where the separation layer 3 is formed on the surface of the porous support, a gas separation membrane with an advantage of having high gas separation selectivity, high gas permeability, and mechanical strength at the same time can be obtained.

In a case where the gas separation membrane according to the embodiment of the present invention is a thin layer composite membrane, it is preferable that the thin layer composite membrane is formed by coating the surface of the porous support with a coating solution (dope) for forming the separation layer 3 (in the present specification, the term "coating" includes a form made by a coating material being adhered to a surface through immersion). Specifically, it is preferable that the support has a porous layer on the separation layer 3 side and more preferable that the support is a laminate of non-woven fabric and a porous layer disposed on the separation layer 3 side.

The material of the porous layer which is preferably applied to the support is not particularly limited and the material is preferably an organic or inorganic material as long as the material satisfies the purpose of providing high mechanical strength and high gas permeability. A porous membrane of an organic polymer is preferable, and the thickness of the porous layer is preferably 1 to 3,000 µm, more preferably of 5 to 500 µm, and still more preferably of 5 to 150 µm. In regard to the pore structure of the porous layer, the average pore diameter thereof is typically 10 µm or less, preferably 0.5 µm or less, and more preferably 0.2 µm or less. The porosity thereof is preferably 20% to 90% and more preferably 30% to 80%. Further, the molecular weight cut-off of the porous layer is preferably 100,000 or less. Moreover, the gas permeability is preferably $3 \times 10^{-5}$ cm$^3$ (STP; STP is an abbreviation standing for standard temperature and pressure)/cm$^2$·cm·sec·cmHg (30 GPU: GPU is an abbreviation standing for gas permeation unit) or greater in terms of the permeation rate of carbon dioxide.

Examples of the material of the porous layer include conventionally known polymers, for example, various resins such as a polyolefin resin such as polyethylene or polypropylene; a fluorine-containing resin such as polytetrafluoroethylene, polyvinyl fluoride, or polyvinylidene fluoride; polystyrene, cellulose acetate, polyurethane, polyacrylonitrile, polyphenylene oxide, polysulfone, polyether sulfone, polyimide, polyamid, and polyethylene terephthalate. As the shape of the porous layer, any of a flat shape, a spiral shape, a tubular shape, and a hollow fiber shape can be employed.

In the thin layer composite membrane, it is preferable that woven fabric, non-woven fabric, or a net used to provide mechanical strength is provided in the lower portion of the porous layer disposed on the side of the separation layer 3. In terms of film forming properties and the cost, non-woven fabric is suitably used. As the non-woven fabric, fibers formed of polyester, polypropylene, polyacrylonitrile, polyethylene, and polyamide may be used alone or in combination of plural kinds thereof. The non-woven fabric can be produced by performing papermaking using main fibers and binder fibers which are uniformly dispersed in water using a circular net or a long net and then drying the fibers with a drier. Moreover, for the purpose of removing a nap or improving mechanical properties, it is preferable that thermal pressing processing is performed on the non-woven fabric by interposing the non-woven fabric between two rolls.

<Resin Layer>

The gas separation membrane according to the embodiment of the present invention has a resin layer and the resin layer includes a compound having a siloxane bond.

Since the gas separation membrane according to the embodiment of the present invention has the support, the resin layer, the separation layer, and the protective layer in this order, the resin layer is provided between the separation layer and the support.

The resin layer is a layer including a resin. The resin used for the resin layer is preferably a compound having a siloxane bond. The compound having a siloxane bond is not particularly limited and dialkylsiloxanes and the like may be used. Among dialkylsiloxanes, polydimethylsiloxane is preferable.

It is preferable that the resin used for the resin layer is a compound having a siloxane bond and has a polymerizable functional group. Examples of such a functional group include an epoxy group, an oxetane group, a carboxyl group, an amino group, a hydroxyl group, and a thiol group. More preferably, the resin layer includes an epoxy group, an oxetane group, a carboxyl group, and a resin having two or more of these groups. Such a resin is preferably formed on the support by curing using radiation irradiation of a radiation curable composition.

The resin used for the resin layer is more preferably polymerizable dialkylsiloxane. The polymerizable dialkylsiloxane is a monomer having a dialkylsiloxane group, a polymerizable oligomer having a dialkylsiloxane group, and a polymer having a dialkylsiloxane group. The resin layer may be formed of a partially cross-linked radiation curable composition having a dialkylsiloxane group. As the dialkylsiloxane group, a group represented by —{O—Si(CH$_3$)$_2$}$_n$— (for example, n represents a number of 1 to 100) can be exemplified. A poly(dialkylsiloxane) compound having a vinyl group at the terminal can be preferably used.

It is preferable that the material of the resin layer is at least one selected from polydimethylsiloxane (hereinafter, also referred to as PDMS), poly(l-trimethylsilyl-1-propyne) (hereinafter, also referred to as PTMSP), or polyethylene oxide, and more preferable that the material thereof is polydimethylsiloxane or poly(l-trimethylsilyl-1-propyne). In the gas separation membrane according to the embodiment of the present invention, the compound having a siloxane bond of the resin layer is preferably polydimethylsiloxane.

Commercially available materials can be used as the material of the resin layer and for example, as the resin of the resin layer, UV9300 (polydimethylsiloxane (PDMS) manufactured by Momentive Performance Materials Inc.), X-22-162C (manufactured by Shin-Etsu Chemical Co., Ltd.) and the like can be preferably used.

As another material of the resin layer, UV 9380C (bis(4-dodecylphenyl)iodonium hexafluoroantimonate, manufactured by Momentive Performance Materials Inc.) and the like can be preferably used.

The material of the resin layer can be prepared as a composition including an organic solvent in a case of forming the resin layer, and is preferably a curable composition.

The thickness of the resin layer is not particularly limited, but the thickness of the resin layer is preferably 20 to 1000 nm, more preferably 20 to 900 nm, and particularly preferably 30 to 800 nm. The thickness of the resin layer can be obtained using a scanning electron microscope (SEM).

<Separation Layer>

The gas separation membrane according to the embodiment of the present invention has a separation layer, and the separation layer has a maximum value of a silicon atom content of 2 atomic % or less in the composition of the half area on the protective layer side in the thickness direction.

Since the gas separation membrane according to the embodiment of the present invention has the support, the resin layer, the separation layer, and the protective layer in this order, the separation layer is provided between the resin layer and the protective layer.

In the present invention, the separation layer the separation layer has a maximum value of a silicon atom content of 2 atomic % or less in the composition of the half area on the protective layer side in the thickness direction and preferably has a maximum value of a silicon atom content of 1 atomic % or less. In addition, in the present invention, the term atomic % refers to the atomic percentage when measured using ESCA.

The maximum value of the silicon atom content of the separation layer in the composition of the half area on the protective layer side in the thickness direction is measured by a method described in the examples of the present specification.

(Thickness)

It is preferable that the thickness of the separation layer is as thin as possible under a condition that high gas permeability is imparted while maintaining high mechanical strength and gas separation selectivity.

From the viewpoint of enhancing gas permeability, it is preferable that the separation layer is a thin layer. The thickness of the separation layer is preferably 3 μm or less, more preferably 1 μm or less, particularly preferably 200 nm or less, and particularly preferably 100 nm or less.

The thickness of the separation layer is typically 10 nm or more and from the viewpoint of practical use and easiness of film production, the thickness is preferably 30 nm or more and more preferably 50 nm or more.

(Resin of Separation Layer)

In the gas separation membrane according to the embodiment of the present invention, it is preferable that the separation layer includes a resin.

The resin of the separation layer includes the followings, but is not limited thereto. Specifically, the above-described compounds having a siloxane bond, polyimides, polyamides, celluloses, polyethylene glycols, and polybenzoxazoles are preferable.

The gas separation membrane according to the embodiment of the present invention, it is preferable that the resin of the separation layer is cellulose or polyimide. In the gas separation membrane according to the embodiment of the present invention, it is preferable that the resin of the separation layer is a polyimide compound.

The polyimide compound is preferably a polyimide having a reactive group. In the gas separation membrane according to the embodiment of the present invention, the resin of the separation layer may be a polyimide including a sulfonamide group.

In the following description, a case where the resin of the separation layer is a polyimide having a reactive group will be described as a representative example.

The polyimide having a reactive group that can be used in the present invention will be described in detail.

In the present invention, in regard to the polyimide compound having a reactive group, a polymer having a reactive group preferably includes a polyimide unit, and a repeating unit having a reactive group at the side chain (preferably having a nucleophilic reactive group, more preferably having a carboxyl group, an amino group, a sulfonamide group or a hydroxyl group).

More specifically, the polymer having a reactive group is preferably a polyimide disclosed in paragraphs <0040> to <0068> of JP2015-160201A or a polyimide having at least a repeating unit represented by Formula (I).

In the gas separation membrane according to the embodiment of the present invention, the resin of the separation layer is more preferably a polyimide having at least the repeating unit represented by Formula (I) and particularly preferably a polyimide including a sulfonamide group.

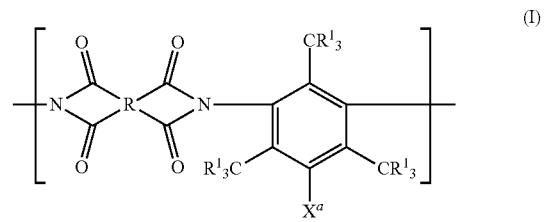

In Formula (I), $R^I$ represents a hydrogen atom, an alkyl group, or a halogen atom. $X^a$ represents a polar group selected from a sulfonamide group, an alkoxysulfonyl group, a carboxyl group, a hydroxyl group, an acyloxy group and a halogen atom.

R represents a group having a structure represented by any one of Formulae (I-1) to (I-28). Here, $X^1$ to $X^3$ each represent a single bond or a divalent linking group, L represents —CH=CH— or —CH$_2$—, $R^1$ and $R^2$ each represent a hydrogen atom or a substituent, and * represents a bonding site with a carbonyl group in Formula (I).

R preferably represents a group represented by Formula (I-1), (I-2), or (I-4), more preferably represents a group represented by Formula (I-1) or (I-4), and particularly preferably represents a group represented by Formula (I-1).

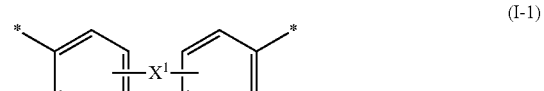

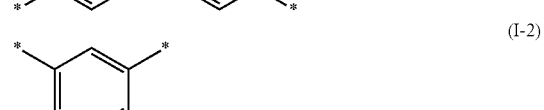

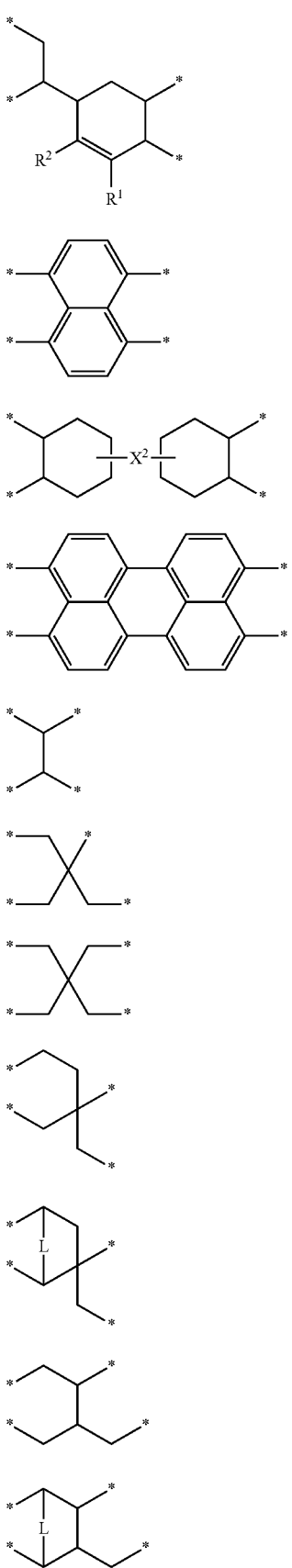
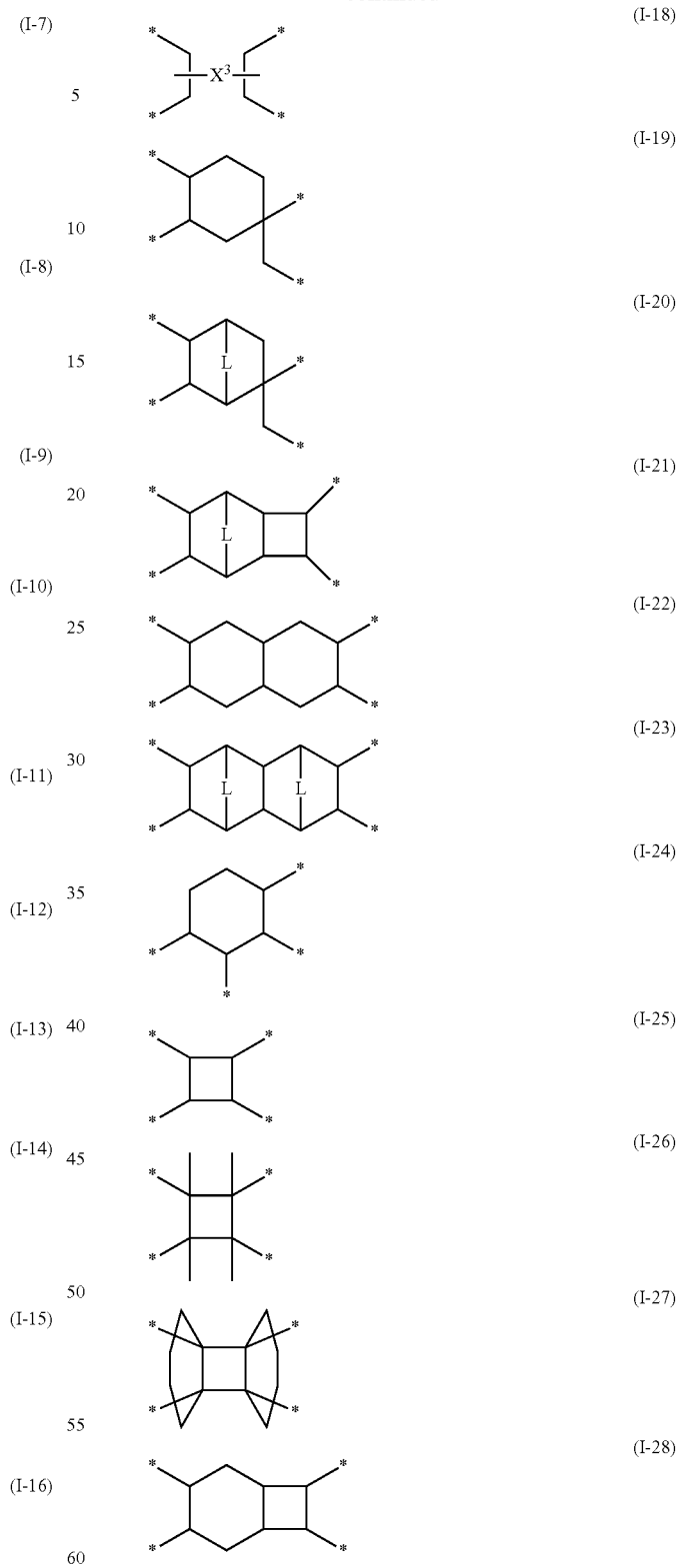
In Formulae (I-1), (I-9), and (I-18), $X^1$ to $X^3$ each represent a single bond or a divalent linking group. As the divalent linking group, —C($R^X$)$_2$— ($R^X$ represents a hydrogen atom or a substituent; in a case where $R^X$ represents a substituent, $R^X$'s may be linked and form a ring), —O—, —SO$_2$—, —C(=O)—, —S—, —NR$^Y$— (R$^Y$ represents a hydrogen atom, an alkyl group (preferably a methyl group or an ethyl group), or an aryl group (preferably a phenyl group)), —$C_6H_4$— (phenylene group), or a combination thereof is preferable, and —$C(R^X)_2$— is more preferable. In a case where $R^X$ represents a substituent, specific example of the substituent include groups selected from the substituent group Z described in paragraphs <0055> to <0060> of JP2015-160201A, and among these, an alkyl group (the preferable range thereof is the same as the alkyl group shown in the substituent group Z described in paragraphs <0055> to <0060> of JP2015-160201A) is preferable, an alkyl group having a halogen atom as a substituent is more preferable, and a trifluoromethyl group is particularly preferable. Formula (I-18) means that $X^3$ is linked to one of two carbon atoms shown on the left side of $X^3$ (the left side of the page, hereinafter, the same is applied to left and right), and one of two carbon atoms shown on the right side of $X^3$.

In Formulae (I-4), (I-15), (I-17), (I-20), (I-21), and (I-23), L represents —CH=CH— or —$CH_2$—.

In Formula (I-7), $R^1$ and $R^2$ each represent a hydrogen atom or a substituent. As the substituent, a group selected from the substituent group Z described in paragraphs <0055> to <0060> of JP2015-160201A may be exemplified. $R^1$ and $R^2$ may be linked to each other and form a ring. $R^1$ and $R^2$ preferably represent a hydrogen atom or an alkyl group, more preferably represent a hydrogen atom, a methyl group, or an ethyl group, and still more preferably represent a hydrogen atom.

A substituent may be added to the carbon atom shown in Formulae (I-1) to (I-28). Specific examples of the substituent include groups selected from the substituent group Z described in paragraphs <0055> to <0060> of JP2015-160201A, and among these, an alkyl group or an aryl group is preferable.

In Formula (I), $R^I$ represents a hydrogen atom, an alkyl group, or a halogen atom. The alkyl group may be linear or branched. The number of carbon atoms of the alkyl group which can be taken as $R^I$ is preferably 1 to 5, more preferably 1 to 3, and still more preferably 1 or 2. The alkyl group which can be taken as $R^I$ may have a hetero atom (preferably an oxygen atom or a sulfur atom) in its chain. As a suitable specific example of $R^I$, a methyl group or an ethyl group is exemplified, and a methyl group is more preferable.

Examples of the halogen atom which can be taken as $R^I$ include a bromine atom, a chlorine atom, an iodine atom, and a fluorine atom, and a bromine atom is more preferable.

$R^I$ more preferably represents a hydrogen atom, a methyl group, or a bromine atom, more preferably represents a hydrogen atom or a methyl group, and still more preferably represents a hydrogen atom.

In Formula (I), $X^a$ represents a polar group selected from a sulfonamide group, an alkoxysulfonyl group, a carboxyl group, a hydroxyl group, an acyloxy group, and a halogen atom.

The sulfonamide group which can be taken as $X^a$ may be unsubstituted or may have a substituent. Among these, the sulfonamide group which can be taken as $X^a$ is preferably unsubstituted, monoalkyl-substituted, or dialkyl-substituted, more preferably unsubstituted or monoalkyl-substituted, and particularly preferably unsubstituted. That is, in a case where the sulfonamide group which can be taken as $X^a$ has a substituent, the substituent is preferably an alkyl group. The alkyl group may be linear or branched and the number of carbon atoms of the alkyl group is preferably 1 to 10, more preferably 1 to 5, and still more preferably 1 to 3. In addition, the alkyl group preferably has a halogen atom as a substituent, and more preferably has a fluorine atom as a substituent. Preferable specific examples of the alkyl group having a sulfonamide group include a methyl group, an ethyl group, an n-propyl group, —$CH_2CF_2CF_2CF_3$, —$CH_2CF_2CF_3$, and —$CH_2CF_3$.

Among these, in a case where the sulfonamide group is monoalkyl-substituted, the alkyl group is a methyl group, but is preferably an alkyl group having a fluorine atom as a substituent and more preferably a methyl group, —$CH_2CF_2CF_2CF_3$, or —$CH_2CF_3$.

In addition, in a case where the sulfonamide group is dialkyl-substituted, the alkyl group is preferably a methyl group.

The sulfonamide group which can be taken as $X^a$ also preferably has a cycloalkyl group as a substituent. The cycloalkyl group preferably has 3 to 15 carbon atoms and more preferably has 6 to 10 carbon atoms. Among these, the cycloalkyl group is preferably an adamantyl group. In a case where the sulfonamide group which can be taken as $X^a$ has a cycloalkyl group as a substituent, the number of cycloalkyl groups of the sulfonamide group is preferably one. That is, the sulfonamide group is preferably a monosubstituted product.

The sulfonamide group which can be taken as $X^a$ is more preferably unsubstituted.

The number of carbon atoms of the alkoxysulfonyl group which can be taken as $X^a$ is preferably 1 to 5 and more preferably 1 to 3. The alkoxy group in the alkoxysulfonyl group which can be taken as $X^a$ is preferably a methoxy group or an ethoxy group and is more preferably a methoxy group.

The number of carbon atoms of the acyloxy group which can be taken as $X^a$ is preferably 2 to 5 and more preferably 2 or 3, and among these, an acetoxy group is particularly preferable.

Examples of the halogen atom which can be taken as $X^a$ include a bromine atom, a chlorine atom, an iodine atom, and a fluorine atom, and a bromine atom is preferable.

As for $X^a$, a sulfonamide group, an alkoxysulfonyl group, a carboxyl group, a hydroxyl group, and an acyloxy group are preferable, a sulfonamide group, an alkoxysulfonyl group, a carboxyl group, and a hydroxyl group are more preferably, a sulfonamide group, a carboxyl group, and a hydroxyl group are particularly preferable, and a sulfonamide group is more particularly preferable.

By forming the separation layer using a polyimide having a repeating unit represented by Formula (I), all of the gas permeability, the gas separation selectivity, and the plasticization resistance of the gas separation membrane to be obtained can be further improved. Although the reason is not clear, it is assumed that since the repeating unit represented by Formula (I) has three $CR^I_3$ groups in the diamine component, the flatness and the packing properties of the polyimide are appropriately suppressed and the free volume fraction is increased so that the gas permeability is improved. In addition, it is also assumed that since the repeating unit represented by Formula (I) has a specific polar group as $X^a$, the polyimide is moderately densified, its motility is lowered, and thereby the permeability of a molecule with a large dynamic molecular diameter can be effectively suppressed so that the gas separation selectivity is further improved.

The polyimide having a repeating unit represented by Formula (I) has a diamine component having three $CR^I_3$ groups. The polyimide having a repeating unit represented by Formula (I) has a specific polar group $X^a$ at a specific site in the diamine component in addition to three $CR^I_3$ groups. Thus, it is assumed that a gas separation membrane which exhibits high gas permeability and gas separation selectivity, is suppressed in affinity with impurities due to the polar group, and has excellent plasticization resistance can be prepared.

The polyimide may be crosslinked by a crosslinking agent.

For example, in a case where the polar group $X^a$ has an unsubstituted or monosubstituted sulfonamide group, for the purpose of forming a crosslinked structure through the NH group of the sulfonamide group, it is possible to use a metal alkoxide such as tetraisopropyl orthotitanate as a crosslinking agent. In addition, in a case where $CR^I_3$ has a halogen atom, for the purpose of conducting a nucleophilic addition reaction, it is possible to use a crosslinking agent such as dimethylaminopropyl triethoxysilane or tetramethyl ethylenediamine.

Further, in a case where the polyimide used in the present invention has a repeating unit represented by Formula (II-a) or (II-b), which will be described later, the polyimide may be crosslinked by a crosslinking agent having a functional group and a reactive group contained in these repeating units.

The repeating unit represented by Formula (I) is preferably a repeating unit represented by Formula (I-a).

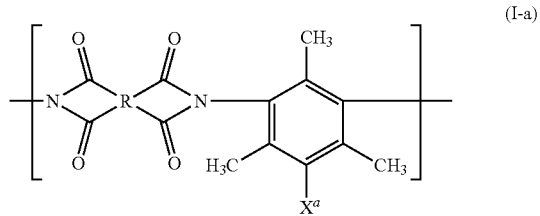

(I-a)

In Formula (I-a), R and $X^a$ each have the same meaning as R and $X^a$ in Formula (I), and the preferable form thereof is the same.

The repeating unit represented by Formula (I-a) is preferably a repeating unit represented by Formula (I-b).

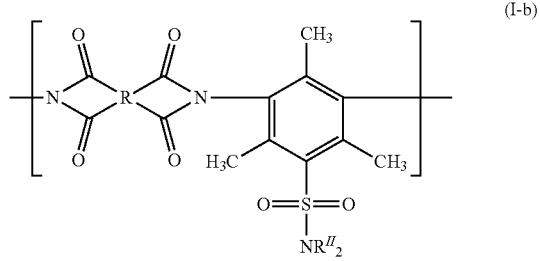

(I-b)

In Formula (I-b), R has the same meaning as R in Formula (I-a), and the preferable form thereof is the same.

$R^{II}$ represents a hydrogen atom or a substituent. It is preferable that at least $R^{II}$ of two $R^{II}$'s represents a hydrogen atom, and it is more preferable that both of two $R^{II}$'s represent a hydrogen atom. In a case where $R^{II}$ represent a substituent, a group selected from the substituent group Z described in paragraphs <0055> to <0060> of JP2015-160201A is preferable and an alkyl group or a cycloalkyl group is more preferable.

The alkyl group which can be taken as $R^{II}$ may be linear or branched and the number of carbon atoms of the alkyl group is preferably 1 to 10, more preferably 1 to 5, and particularly preferably 1 to 3. In addition, the alkyl group preferably has a halogen atom as a substituent and more preferably has a fluorine atom as a substituent. Preferable specific examples in a case where $R^{II}$ represents an alkyl group include a methyl group, an ethyl group, an n-propyl group, —$CH_2CF_2CF_2CF_3$, —$CH_2CF_2CF_3$, and —$CH_2CF_3$.

In a case where one of two $R^{II}$'s represents a hydrogen atom and the other represents an alkyl group, the alkyl group preferably represents a methyl group or an alkyl group having a fluorine atom as a substituent and more preferably represents a methyl group, —$CH_2CF_2CF_2CF_3$, or —$CH_2CF_3$.

In a case where both of two $R^{II}$'s represent an alkyl group, the alkyl group is preferably a methyl group.

The number of carbon atoms of the cycloalkyl group which can be taken as $R^{II}$ is preferably 3 to 15 and more preferably 6 to 10. In a case where $R^{II}$ represents a cycloalkyl group, an adamantyl group is preferable. In a case where one of two $R^{II}$'s represents a cycloalkyl group, the other preferably represents a hydrogen atom.

The repeating unit represented by Formula (I-b) is preferably a repeating unit represented by Formula (I-c).

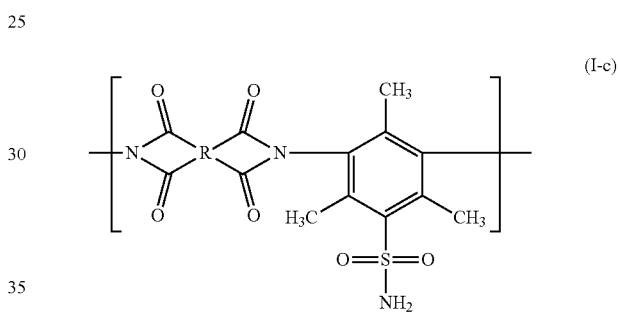

(I-c)

In Formula (I-c), R has the same as R in Formula (I-b), and the preferable form is the same.

The polyimide used in the present invention may have a repeating unit represented by Formula (II-a) or (II-b) in addition to the repeating unit represented by Formula (I).

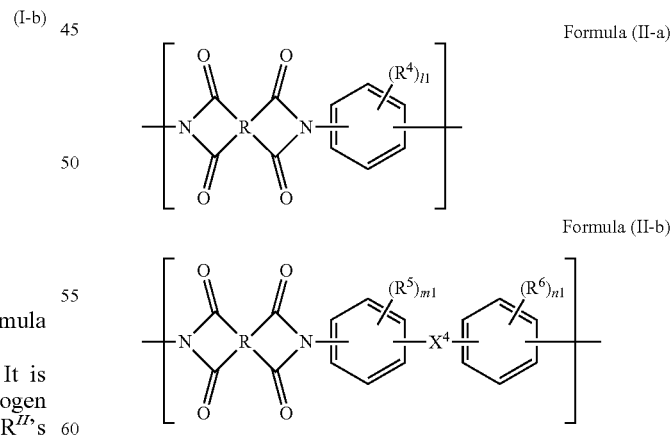

Formula (II-a)

Formula (II-b)

In Formulae (II-a) and (II-b), R has the same meaning as R in Formula (I), and the preferable range thereof is also the same. $R^4$ to $R^6$ each represent a substituent. As the substituent, a group selected from the substituent group Z described in paragraphs <0055> to <0060> of JP2015-160201A may be exemplified.

R⁴ preferably represents an alkyl group, a carboxyl group, or a halogen atom. l1 indicating the number of R⁴'s is an integer of 0 to 4, and in a case where R⁴ represents an alkyl group, l1 is preferably 1 to 4, more preferably 2 to 4, and particularly preferably 3 or 4. In a case where R⁴ represents a carboxyl group, l1 is preferably 1 to 2 and more preferably 1. In a case where R⁴ represents an alkyl group, the number of carbon atoms of the alkyl group preferably 1 to 10, more preferably 1 to 5, and particularly preferably 1 to 3. In a case where R⁴ represents an alkyl group, a methyl group, an ethyl group, or a trifluoromethyl group is more particularly preferable.

In Formula (II-a), two linking sites for incorporation in the polyimide in the diamine component (that is, the phenylene group having R⁴) are preferably located at the meta or para position with respect to each other and more preferably located at the para position with respect to each other.

In the present invention, the structure represented by Formula (I) is not included in the structure represented by Formula (II-a).

It is preferable that R⁵ and R⁶ represent an alkyl group or a halogen atom, or groups that are linked to each other and form a ring with X⁴ together. In addition, it is also preferable that two R⁵'s are linked and form a ring or two R⁶'s are linked and form a ring. The structure formed by linking R⁵ and R⁶ is not particularly limited but a single bond, —O—, or —S— is preferable. m1 and n1 indicating the number of R⁵ and R⁶ are integers of 0 to 4, preferably 1 to 4, more preferably 2 to 4, and particularly preferably 3 or 4. In a case where R⁵ and R⁶ each represent an alkyl group, the number of carbon atoms of the alkyl group is preferably 1 to 10, more preferably 1 to 5, and particularly preferably 1 to 3. In a case where R⁵ and R⁶ each represent an alkyl group, a methyl group, an ethyl group, or a trifluoromethyl group is more particularly preferable.

X⁴ has the same meaning as X¹ in Formula (I-1), and the preferable range thereof is also the same.

In the polyimide, the ratio of the molar amount of the repeating unit represented by Formula (I) with respect to the total molar amount of the repeating unit represented by Formula (I), the repeating unit represented by Formula (II-a), and the repeating unit represented by Formula (II-b) in the structure is preferably 50% to 100% by mole, more preferably 70% to 100% by mole, particularly preferably 80% to 100% by mole, and more particularly preferably 90% to 100% by mole. A case where the ration of the molar amount of the repeating unit represented by Formula (I) with respect to the total molar amount of the repeating unit represented by Formula (I), the repeating unit represented by Formula (II-a), and the repeating unit represented by Formula (II-b) is 100% by mole means that the polyimide does not have any of the repeating unit represented by Formula (II-a) and the repeating unit represented by Formula (II-b).

The polyimide may be formed of the repeating unit represented by Formula (I) or may have repeating units other than the repeating unit represented by Formula (I).

In a case where the polyimide has repeating units other than the repeating unit represented by Formula (I), the remainder other than the repeating unit represented by Formula (I) is preferably formed of the repeating unit represented by Formula (II-a) and/or (II-b).

In the gas separation membrane according to the embodiment of the present invention, it is preferable that the resin of the separation layer is a polyimide having a structure derived from 4,4'-(hexafluoroisopropylidene)diphthalic acid anhydride (6FDA) from the viewpoint of separation selectivity and gas permeability. That is, it is preferable that a mother nucleus R is a group represented by Formula (I-1), X¹ is —C(R^X)₂—, and R^x is trifluoromethyl.

In the present specification, in a case where the expression "may be linked to each other and form a ring", the linkage may be made by a single bond or a double bond and then a cyclic structure may be formed or condensation may be made and then a condensed ring structure may be formed.

The substituent group Z described in paragraphs <0055> to <0060> of JP2015-160201A may be further substituted with one or more substituents selected from the substituent group Z.

In the present invention, in a case where a plurality of substituent groups are present at one structural site, these substituents may be linked to each other and form a ring or may be condensed with some or entirety of the structural site and form an aromatic ring or an unsaturated hetero ring.

In a case where a compound, a substituent, or the like includes an alkyl group, an alkenyl group, or the like, these may be linear or branched, and may be substituted or unsubstituted. In addition, in a case where a compound, a substituent, or the like includes an aryl group, a heterocyclic group, or the like, these may be monocyclic or condensed, and may be substituted or unsubstituted.

In the present specification, unless otherwise stated, those which are simply described as a substituent refer to the substituent group Z described in paragraphs <0055> to <0060> of JP2015-160201A, and only in a case where the name of each group is described (for example, only in a case where "alkyl group" is described), the preferable ranges and/or specific examples of the groups corresponding to the substituent group Z are applied.

The molecular weight of the polyimide which can be used in the present invention is preferably 10,000 to 1000,000, more preferably 15,000 to 500,000, and still more preferably 20,000 to 200,000 as the weight-average molecular weight.

The molecular weight and the dispersity in the present specification are set to values measured using a gel permeation chromatography (GPC) method unless otherwise specified, and the molecular weight is set to a weight-average molecular weight in terms of polystyrene. A gel having an aromatic compound as a repeating unit is preferable as a gel filling a column used for the GPC method and for example, a gel formed of a styrene-divinylbenzene copolymer is exemplified.

It is preferable that two to six columns are connected to each other and used.

Examples of a solvent to be used include an ether-based solvent such as tetrahydrofuran and an amide-based solvent such as N-methylpyrrolidinone.

It is preferable that measurement is performed at a flow rate of the solvent of 0.1 mL/min to 2 mL/min and most preferable that the measurement is performed at a flow rate thereof of 0.5 mL/min to 1.5 mL/min. In a case where the measurement is performed in the above range, a load is not applied to the device and the measurement can be more efficiently performed.

The measurement temperature is preferably 10° C. to 50° C. and more preferably 20° C. to 40° C.

The column and the solvent to be used can be appropriately selected according to the physical properties of a polymer compound which is a target for measurement.

The polyimide having a reactive group that can be used in the present invention can be synthesized by performing condensation and polymerization of a specific bifunctional acid anhydride (tetracarboxylic dianhydride) and a specific diamine. As the method, a technique described in a general book (for example, "The Latest Polyimide~Fundamentals and Applications~" edited by Toshio Imai and Rikio Yokota, NTS Inc., pp. 3 to 49, published by NTS Inc. on Aug. 25, 2010) can be appropriately selected.

In the synthesis of the polyimide that can be used in the present invention, at least one kind of tetracarboxylic dianhydride as one raw material is preferably represented by Formula (IV). It is preferable that all tetracarboxylic dianhydrides used as raw materials are represented by Formula (IV).

Formula (IV)

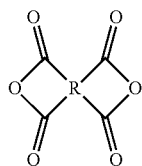

In Formula (IV), R has the same meaning as R in Formula (I).

Specific examples of tetracarboxylic dianhydride that can be used in the present invention include the followings.

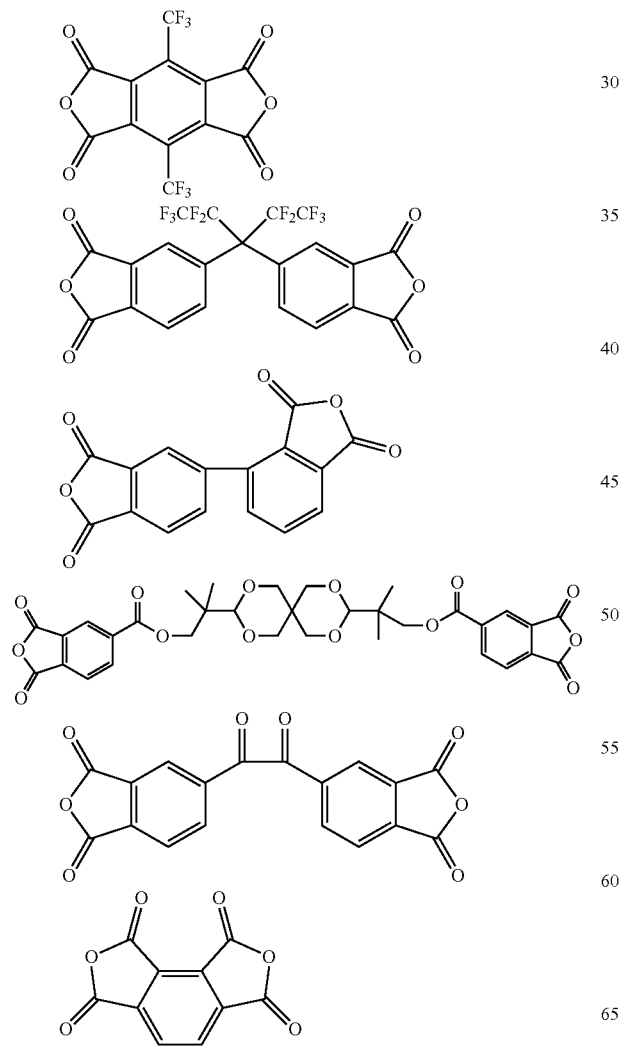

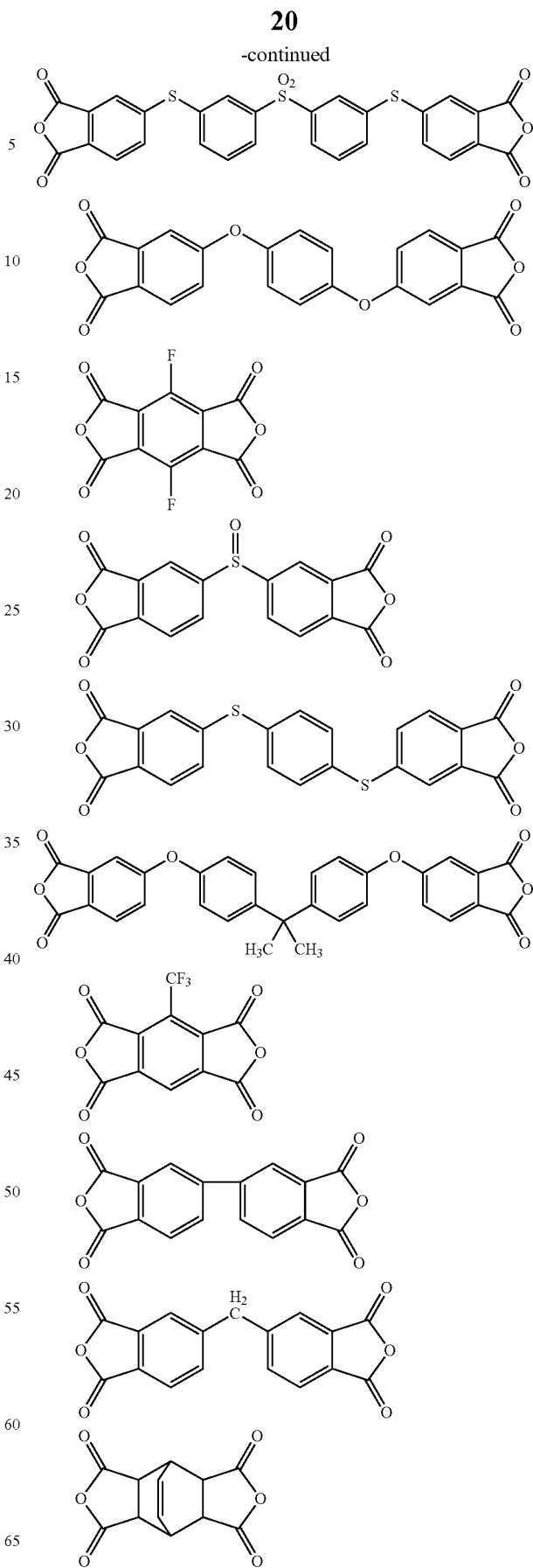

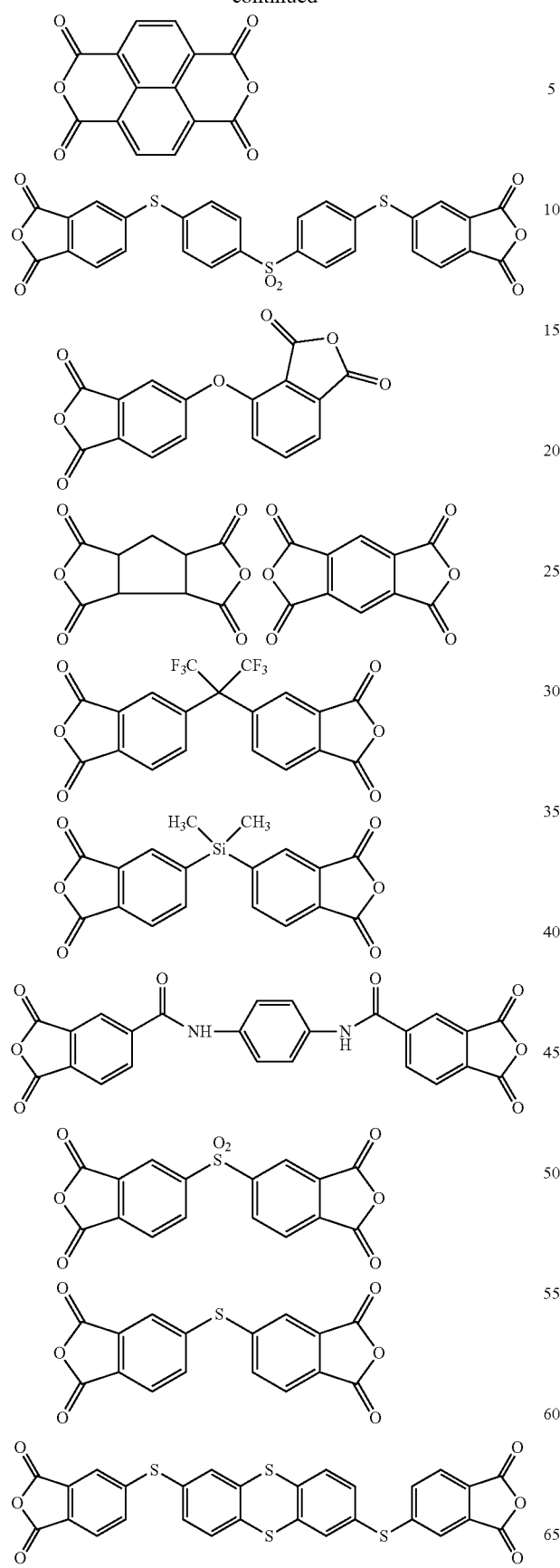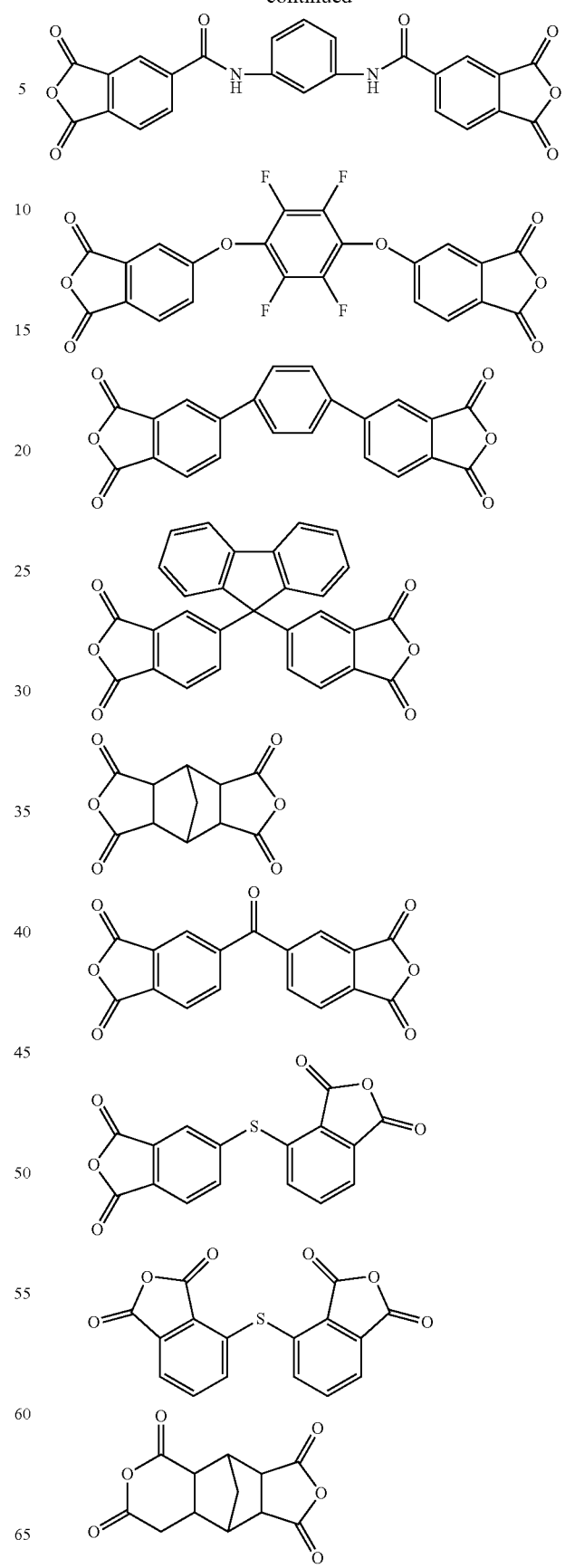

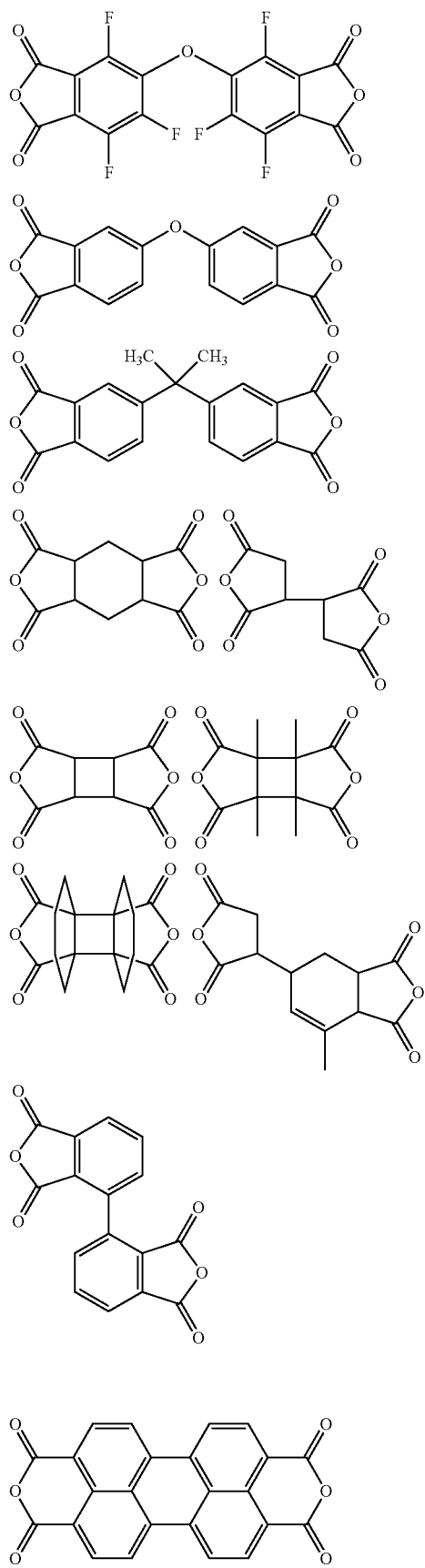
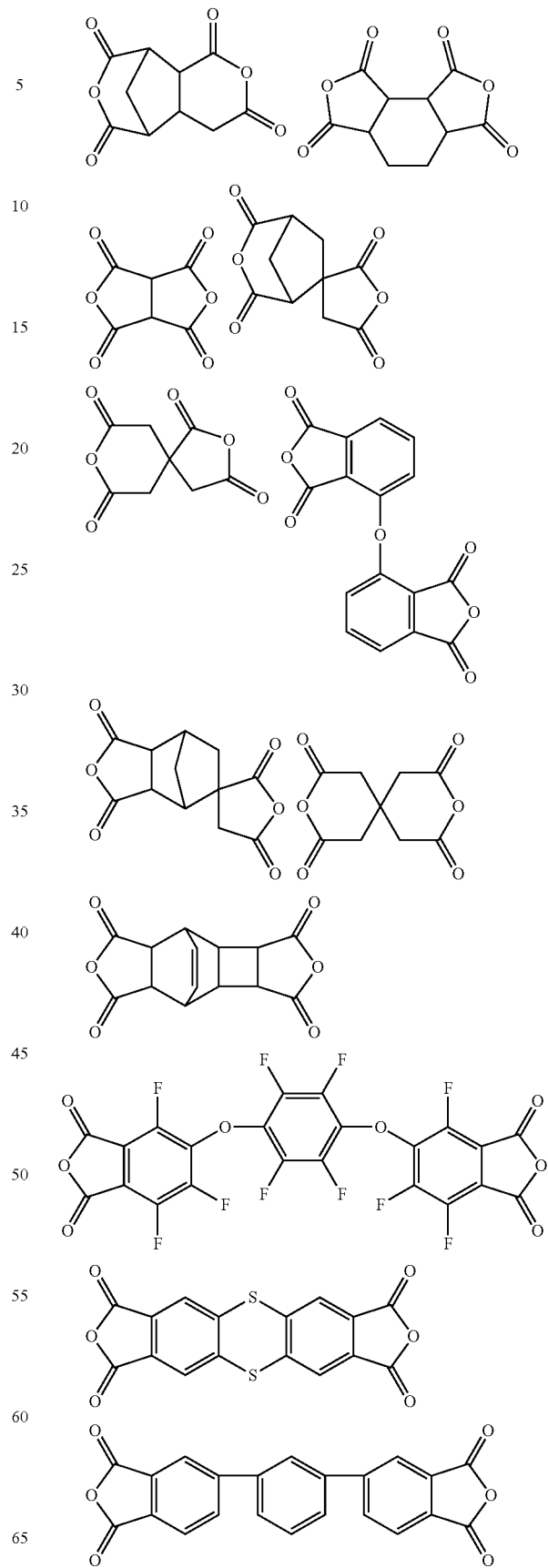

-continued

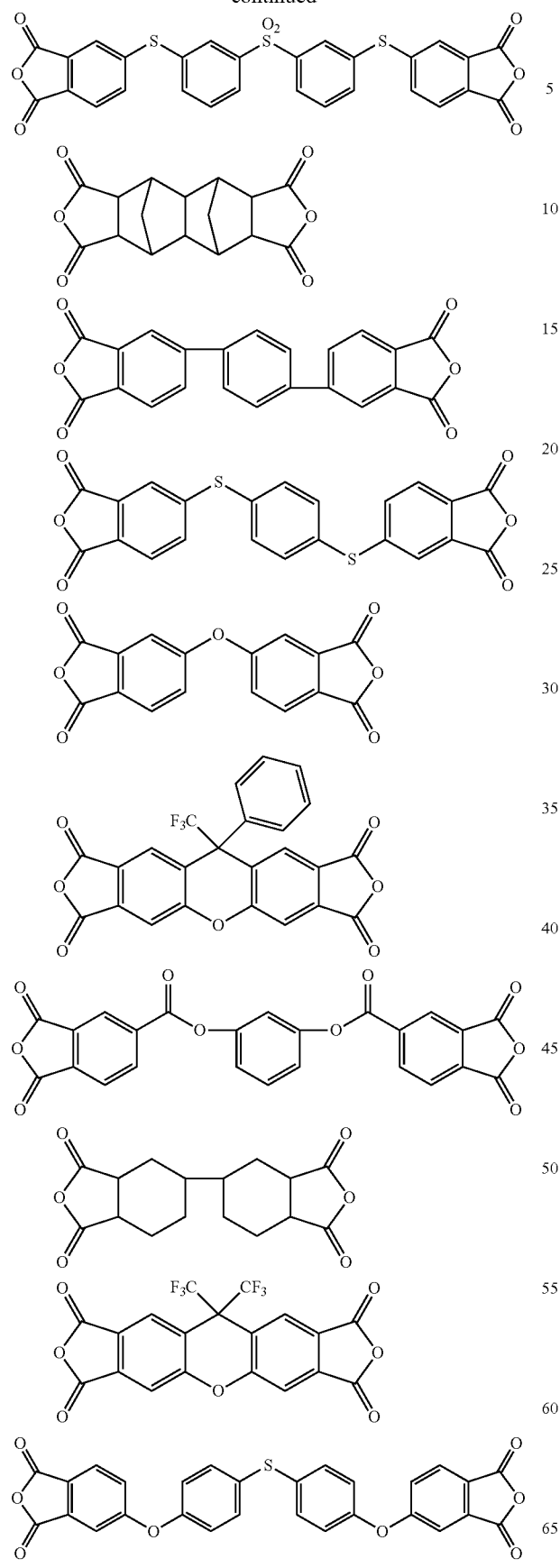

-continued

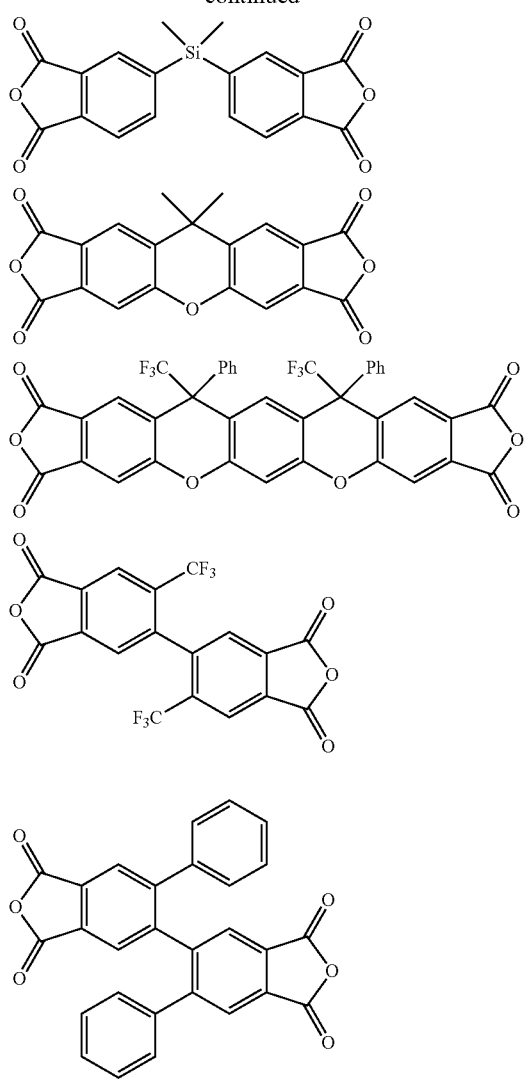

In the synthesis of the polyimide that can be used in the present invention, at least one kind of diamine compound as the other raw material is preferably represented by Formula (V).

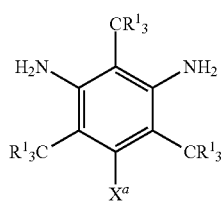

(V)

In Formula (V), $R^I$ and $X^a$ each have the same meaning as $R^I$ and $X^a$ in Formula (I).

Specific examples of the diamine compound represented by Formula (V) include the followings. However, the present invention is not limited to these compounds. In the present specification, Me means a methyl group and Et means an ethyl group.

-continued
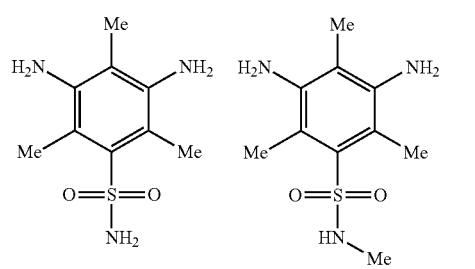
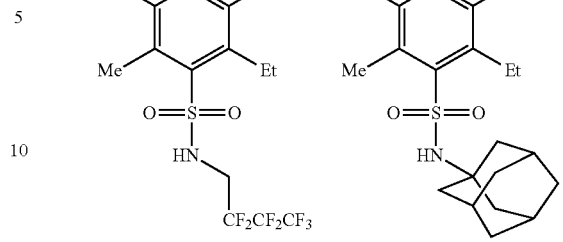
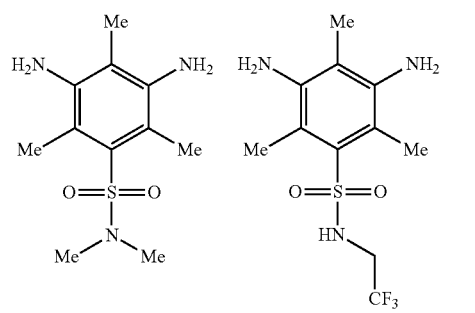
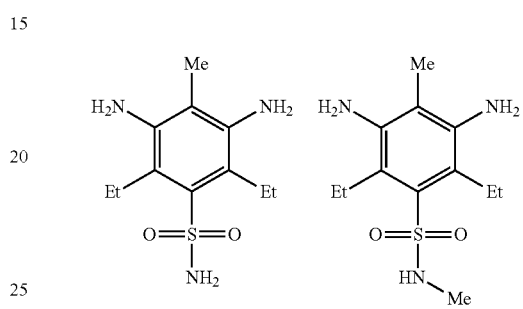
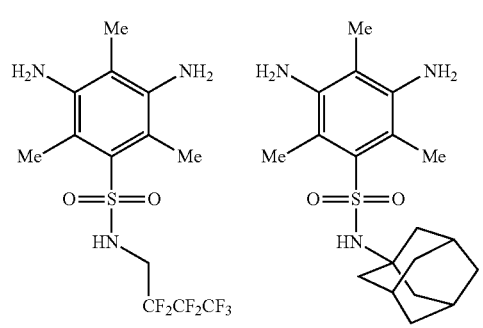
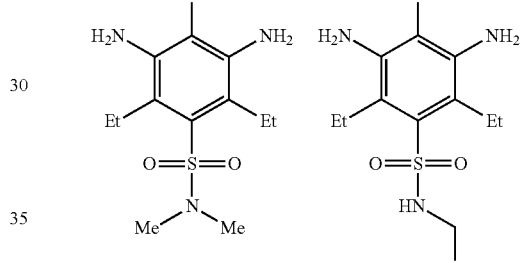
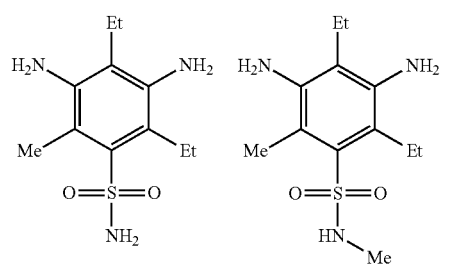
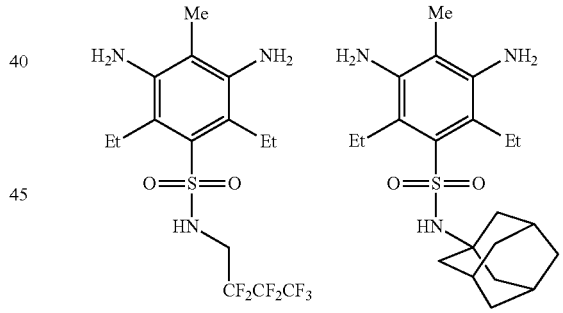
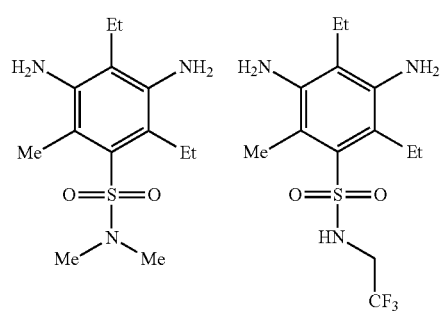
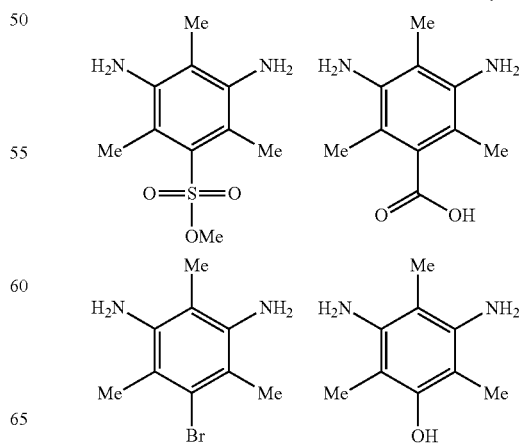

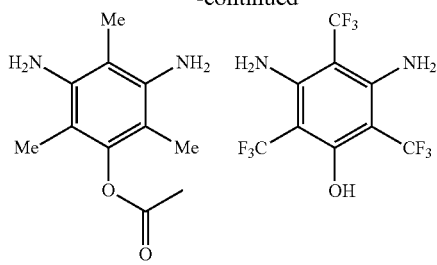
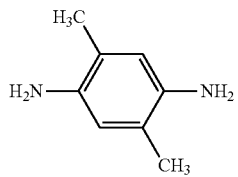

In addition, in the synthesis of the polyimide that can be used in the present invention, as the diamine compound used as a raw material, in addition to the diamine compound represented by Formula (V), a diamine compound represented by Formula (VII-a) or (VII-b) may be used.

Formula (VII-a)
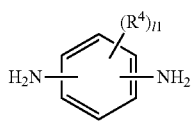

Formula (VII-b)
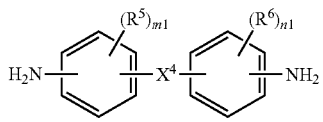

In Formula (VII-a), $R^4$ and 11 each represent the same meaning as $R^4$ and 11 in Formula (II-a). The diamine compound represented by Formula (VII-a) does not include the diamine compound represented by Formula (V).

In Formula (VII-b), $R^5$, $R^6$, $X^4$, m1, and n1 each represent the same meaning as $R^5$, $R^6$, $X^4$, m1, and n1 in Formula (II-b).

As the diamine compound represented by Formula (VII-a) or (VII-b), for example, the compounds shown below can be used.

Diamine-1
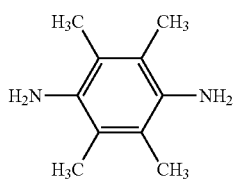

Diamine-2
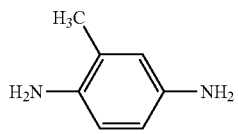

Diamine-3

Diamine-4
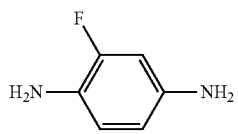

Diamine-5
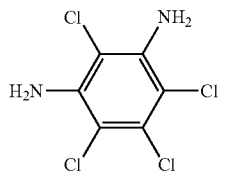

Diamine-11
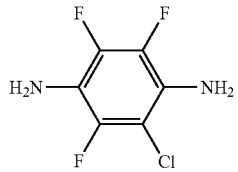

Diamine-12
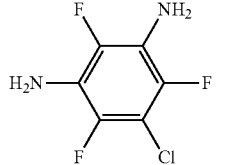

Diamine-13
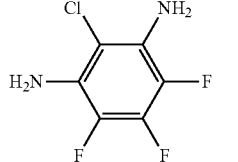

Diamine-14
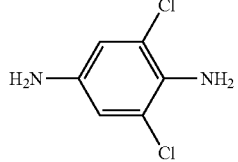

Diamine-15
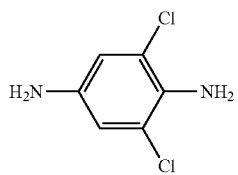

Diamine-31
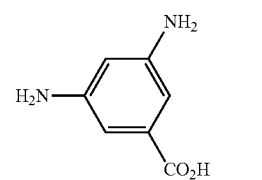
Diamine-32
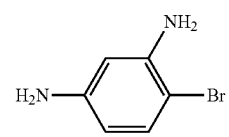
Diamine-33
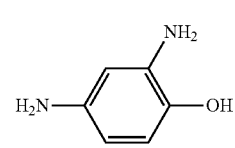
Diamine-34
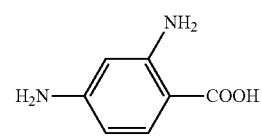
Diamine-35
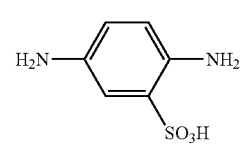
Diamine-41
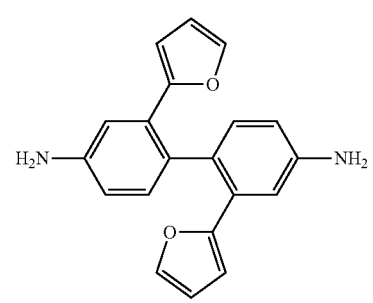
Diamine-42
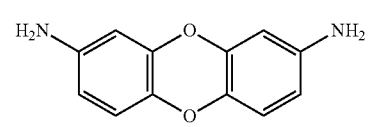
Diamine-43
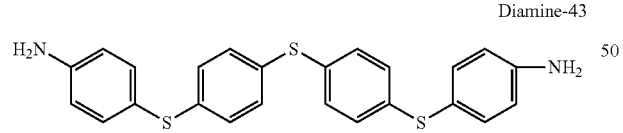
Diamine-44
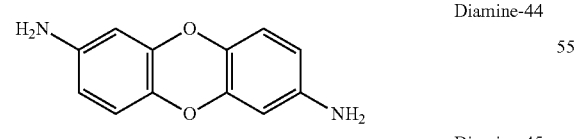
Diamine-45
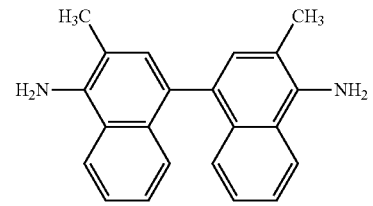
Diamine-51
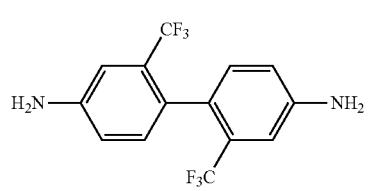
Diamine-52
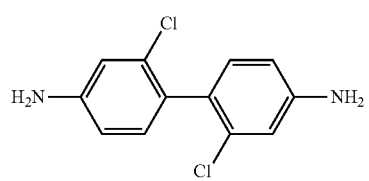
Diamine-53
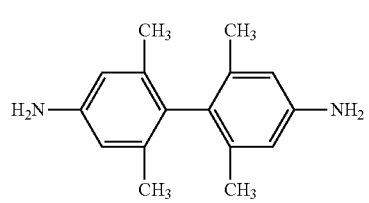
Diamine-54
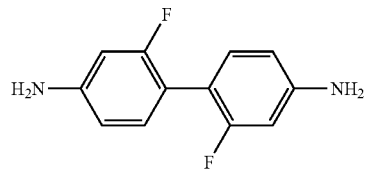
Diamine-55
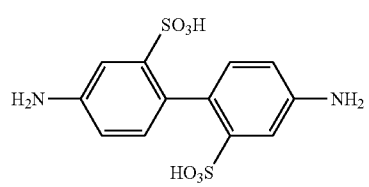
Diamine-61
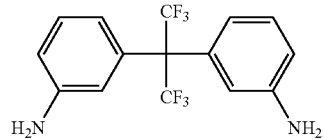
Diamine-62
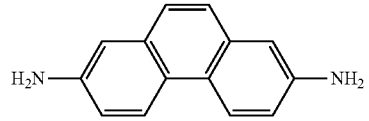
Diamine-63
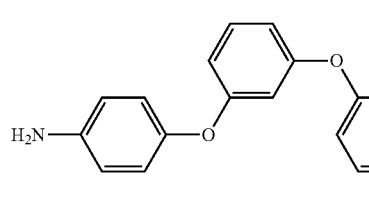

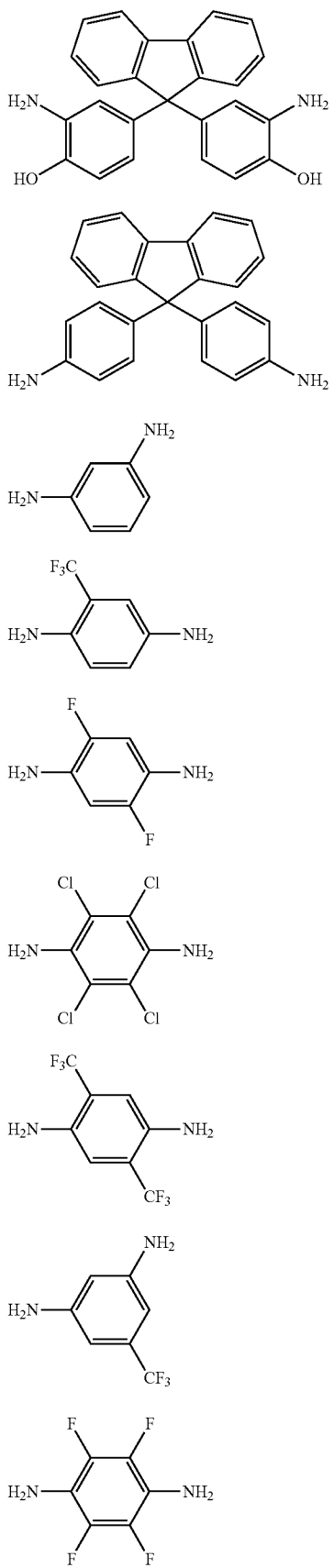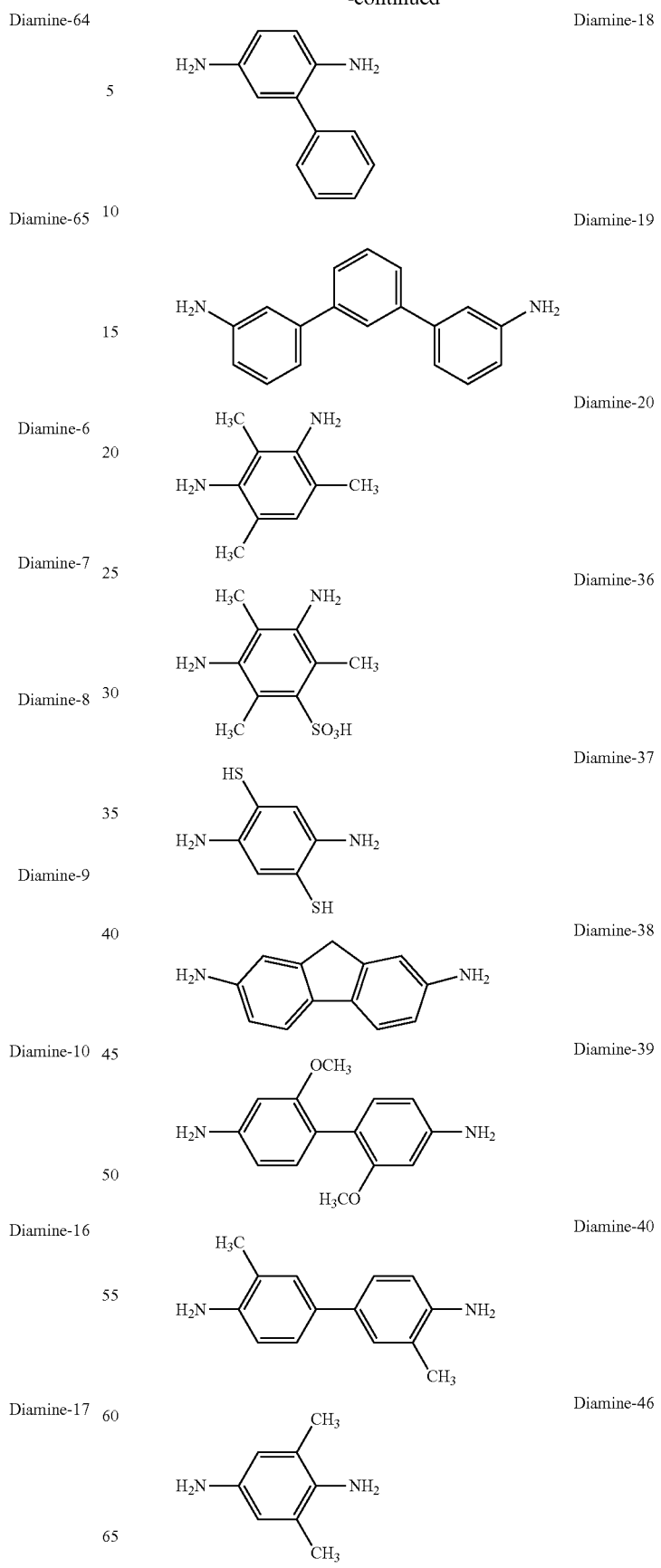

Diamine-47
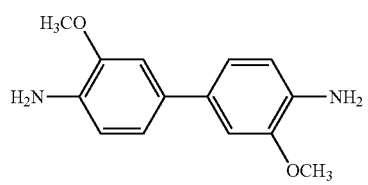

Diamine-48
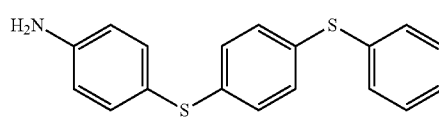

Diamine-49
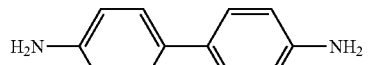

Diamine-50
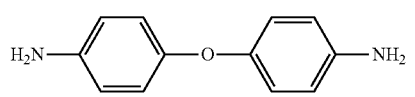

Diamine-56
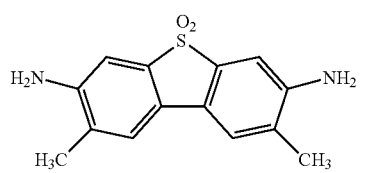

Diamine-57
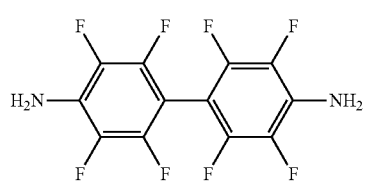

Diamine-58
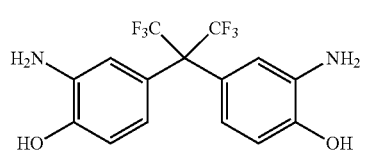

Diamine-59
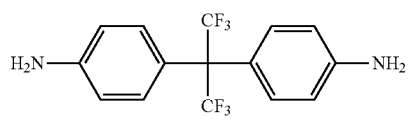

Diamine-60
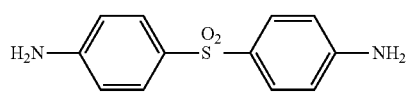

Diamine-66
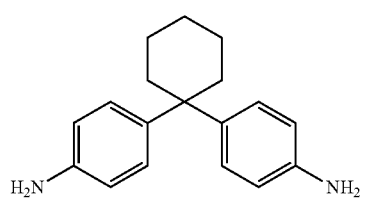

Diamine-67
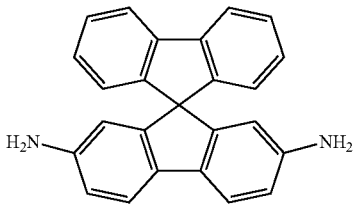

Diamine-68
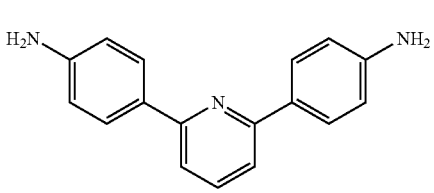

Diamine-69
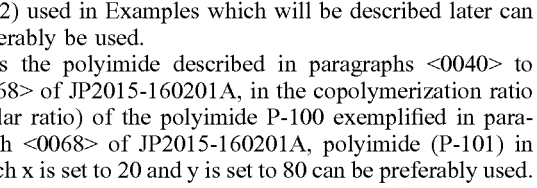

Diamine-70
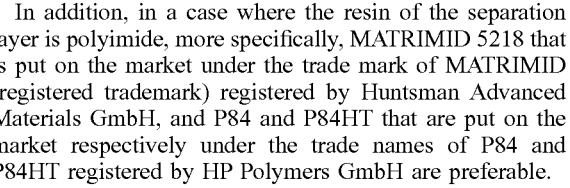

The monomer represented by Formula (IV) and the monomer represented by Formula (V), (VII-a) or (VII-b) may be used as an oligomer or prepolymer in advance. The polyimide used in the present invention may be any of a block copolymer, a random copolymer and a graft copolymer.

As the polyimide represented by Formula (I), polyimide (P-02) used in Examples which will be described later can preferably be used.

As the polyimide described in paragraphs <0040> to <0068> of JP2015-160201A, in the copolymerization ratio (molar ratio) of the polyimide P-100 exemplified in paragraph <0068> of JP2015-160201A, polyimide (P-101) in which x is set to 20 and y is set to 80 can be preferably used.

In addition, in a case where the resin of the separation layer is polyimide, more specifically, MATRIMID 5218 that is put on the market under the trade mark of MATRIMID (registered trademark) registered by Huntsman Advanced Materials GmbH, and P84 and P84HT that are put on the market respectively under the trade names of P84 and P84HT registered by HP Polymers GmbH are preferable.

On the other hand, the resin of the separation layer other than polyimide can be selected from celluloses such as cellulose acetate, cellulose triacetate, cellulose acetate butyrate, cellulose propionate, ethyl cellulose, methyl cellulose, and nitrocellulose.

The degree of substitution of all acyl groups of celluloses that can be used for the separation layer is preferably 2.0 to 2.7. Cellulose acetate commercially available as cellulose acetate L-40 (degree of substitution of acyl group: 2.5, manufactured by Daicel Corporation) can also be preferably used.

Other resins for the separation layer can be selected from polyethylene glycols such as a polymer obtained by polymerizing polyethylene glycol #200 diacrylate (manufactured by Shin-Nakamura Chemical Co., Ltd.), and a polymer described in JP2010-513021A.

<Protective Layer>

The gas separation membrane according to the embodiment of the present invention includes a protective layer. The protective layer is in direct contact with the separation layer, the composition of the protective layer is different from the composition of the resin layer, and the composition of the protective layer is different from the composition of the separation layer.

In the gas separation membrane according to the embodiment of the present invention, the silicon atom content of the protective layer is preferably 5 atomic % or less, more preferably 3 atomic % or less, and particularly preferably 1 atomic % or less.

(Thickness)

It is preferable that the thickness of the protective layer is as thin as possible under a condition that mechanical strength, gas separation selectivity, and gas permeability are imparted.

In the gas separation membrane according to the embodiment of the present invention, the thickness of the protective layer is preferably 20 to 200 nm, more preferably 20 to 100 nm, and particularly preferably 30 to 90 nm.

(Layer Configuration)

The separation layer may be formed of a single layer or two or more layers.

The gas separation membrane preferably has one to five separation layers, more preferably has one to three separation layers, from the viewpoint of the production cost, particularly preferably has one or two separation layers, and more particularly preferably has a single layer.

In a case where the separation layer is formed of two or more layers, the separation layer may be formed by laminating two or more same or different layers.

(Insolubility in Organic Solvent)

It is preferable that the protective layer has a crosslinked structure from the viewpoint of rub resistance.

The protective layer having a crosslinked structure can be confirmed by, for example, insolubilization in an organic solvent.

In the gas separation membrane according to the embodiment of the present invention, it is preferable that the protective layer is insoluble in an organic solvent containing toluene and heptane at a compositional ratio of 1:1 by mass ratio from the viewpoint of rub resistance. It is preferable that the separation layer is insoluble in three organic solvents of an organic solvent of toluene, an organic solvent of heptane, and an organic solvent of methyl ethyl ketone.

The protective layer may be a sol-gel cured product obtained by hydrolysis and polycondensation. In this case, it is preferable that a sol-gel method reaction is initiated or promoted based on photoexcitation.

(Resin of Protective Layer)

In the gas separation membrane according to the embodiment of the present invention, it is preferable that the protective layer includes a resin.

The resin of the protective layer may include a resin obtained by polymerizing an arbitrary monomer. In addition, the resin of the protective layer may include a resin obtained by subjecting an arbitrary resin and/or a resin obtained by polymerizing an arbitrary monomer to crosslinking.

Depending on the kind of resin of the protective layer, the embodiment of the protective layer can be divided into a first preferable embodiment of the protective layer and a second preferable embodiment of the protective layer.

Hereinafter, (I) first preferable embodiment of the protective layer and (II) second preferable embodiment of the protective layer will be described.

(I) First Preferable Embodiment of Protective Layer

In the first preferable embodiment of the protective layer, it is preferable that the protective layer includes a halogen atom-containing resin (for example, fluorine atom-containing resin) as the resin of the protective layer. According to the first preferable embodiment of the protective layer, toluene separation selectivity can be enhanced while gas permeability is lowered compared to the second preferable embodiment of the protective layer.

However, in the first preferable embodiment of the protective layer, resins other than the halogen atom-containing resin may be included. The resins other than the halogen atom-containing resin will be described in the section "(II) Second Preferable Embodiment of Protective Layer".

In the first preferable embodiment of the protective layer, in the gas separation membrane according to the embodiment of the present invention, it is preferable that 50 atomic % or more of the composition of the protective layer is constituted of a carbon atom, a hydrogen atom, a nitrogen atom, an oxygen atom, and a halogen atom, it is more preferable that 90 atomic % or more of the composition thereof is constituted of a carbon atom, a hydrogen atom, a nitrogen atom, an oxygen atom, and a halogen atom, and it is particularly preferable that 95 atomic % or more of the composition thereof is constituted of a carbon atom, a hydrogen atom, a nitrogen atom, an oxygen atom, and a halogen atom.

In the first preferable embodiment of the protective layer, in the gas separation membrane according to the embodiment of the present invention, the halogen atom content (particularly, fluorine atom content) of the composition of the protective layer is preferably 10 atomic % or more, more preferably 15 to 30 atomic %, and particularly preferably 20 to 30 atomic %.

In the first preferable embodiment of the protective layer, the halogen atom is preferably a fluorine atom or a bromine atom and more preferably a fluorine atom. That is, in the first preferable embodiment of the protective layer, in the gas separation membrane according to the embodiment of the present invention, it is preferable that the halogen atom is a fluorine atom, and the fluorine atom content of the composition of the protective layer is 10 atomic % or more.

—Halogen Atom-Containing Resin—

The halogen atom-containing resin used as the resin of the protective layer is not particularly limited.

The halogen atom-containing resin is a general term for resins containing a halogen atom in the molecule, and for example, in a case where a halogen atom is contained in the molecule of an acrylic resin, the resin is a halogen atom-containing resin and is one of halogen atom-containing acrylic resins. Further, a copolymer of a halogen atom-containing resin and a resin not containing a halogen atom is one of halogen atom-containing resins since a halogen atom is contained in the molecule. As described above, the halogen atom-containing resin has a very wide range.

The halogen atom-containing resin is preferably a fluorine atom-containing resin or a bromine atom-containing resin and is more preferably a fluorine atom-containing resin.

—Fluorine Atom-Containing Resin—

Examples of the resin of the protective layer include a fluorine-containing polyimide described in JP1996-052332A (JP-H08-052332A), a perfluoro resin including a heterocyclic structure in the main chain (perfluorocyclopolymer), a fluoro(meth)acrylate polymer, and a fluoroolefin polymer.

The gas separation membrane according to the embodiment of the present invention preferably includes at least one of a fluoro(meth)acrylate polymer or a fluoroolefin polymer as the resin of the protective layer.

As the fluoro(meth)acrylate polymer, a polymer obtained by polymerizing a composition including a fluoro(meth)acrylate which is an example of a monomer having a fluorine atom, which will be described later, may be exemplified.

Further, commercially available fluoro(meth)acrylate polymers can be used.

As other fluoro(meth)acrylate polymers, fluorine-containing acrylic acid derivative polymers described in paragraphs <0014> to <0022> of JP1985-118217A (JP-S60-118217A) may be exemplified, the content of which is incorporated herein.

Examples of the fluoroolefin polymer include a homopolymer or copolymer of fluoroolefin and an alternating copolymer of fluoroolefin and vinyl ether.

Examples of the homopolymer or copolymer of fluoroolefin include tetrafluoroethylene resin or oligomer thereof, and tetrafluoroethylene-hexafluoropropylene copolymer resin.

Examples of the alternating copolymer of fluoroolefin and vinyl ether include a tetrafluoroethylene-fluorinated vinyl ether copolymer resin or the like.

Examples of the fluoroolefin polymer include compounds described in paragraph <0011> of JP1993-329343A (JP-H05-329343A) and compounds described in paragraphs <0016> to <0025> of JP2016-503448A, the contents of which are incorporated herein.

As the fluorine atom-containing resin, commercially available products may be used.

Examples of commercially available fluorine atom-containing resins include CYTOP series (CYTOP CTX or the like used in Examples, which will be described later) manufactured by Asahi Glass Co. Ltd., Lumiflon series manufactured by Asahi Glass Co. Ltd., Kynar series manufactured by Arkema S. A., FLUONATE series manufactured by DIC Corporation (FLUONATE K-704 or the like used in Examples, which will be described later), MEGAFACE series manufactured by DIC Corporation, DEFENSA OP series manufactured by DIC Corporation, and Nafion series manufactured by Sigma-Aldrich.

The protective layer preferably has a crosslinked structure. A resin obtained by using the resin used for the protective layer described above as a resin precursor and carrying out a crosslinking reaction of the resin precursor may be used as the resin of the protective layer.

In the gas separation membrane according to the embodiment of the present invention, it is preferable that the resin of the protective layer preferably includes at least one of an acrylic ester bond, a methacrylic ester bond, a urethane bond, or an ether bond.

As the acrylic ester bond and the methacrylic ester bond, a structure in which a fluoro(meth)acrylate monomer described below is polymerized and/or a structure in which a silicone acrylate-based monomer described below is polymerized is preferable.

As the urethane bond, a structure in which a fluoro(meth)acrylate monomer described below is crosslinked with a polymerization initiator (preferably a curing agent, more preferably a polyisocyanate) described later is preferable.

As the ether bond, a bond between a group derived from a polyhydric alcohol contained in the molecule of a fluoro(meth)acrylate monomer described later and a (meth)acryloyl group is preferable.

—Halogen Atom-Containing Monomer—

In the first preferable embodiment of the protective layer, as a monomer for forming the resin of the protective layer, a halogen atom-containing monomer is preferably used.

However, also in the first preferable embodiment of the protective layer, as a monomer for forming the resin of the protective layer, monomers other than the halogen atom-containing monomer may be used. The monomers other than the halogen atom-containing monomer will be described in the section "(II) Second Preferable Embodiment of Protective Layer".

The monomer used for forming the resin of the protective layer is preferably present as a resin obtained by polymerization and/or crosslinking in the protective layer of the gas separation membrane.

Examples of the halogen atom-containing monomer include a monomer having a fluorine atom and a monomer having a bromine atom. The halogen atom-containing monomer is preferably a monomer having a fluorine atom.

——Monomer Having Fluorine Atom——

As the monomer having a fluorine atom, a fluorine atom modified dimethylsiloxane monomer, fluoroacrylate, a fluoroepoxy monomer, a fluoroolefin monomer, and fluoro(meth)acrylate may be exemplified.

Among these, fluoro(meth)acrylate is preferable.

Specifically, (meth)acrylate compounds containing a fluorine atom-containing hydrocarbon group described in paragraphs <0019> to <0026> of JP2014-105271A, and compounds described in paragraphs <0047> to <0060> and <0126> of JP2012-99638A can be used, the contents of which are incorporated herein.

The (meth)acrylate compound containing a fluorine atom-containing hydrocarbon group is preferably a compound represented by Formula (1) or (2).

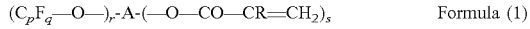

$$(C_pF_q\text{—O—})_r\text{-A-(—O—CO—CR=CH}_2)_s \qquad \text{Formula (1)}$$

In Formula (1), p represents an integer of 1 to 18, q represents an integer of 3 to 37, r represents an integer of 1 to 18, s represents an integer of 2 to 19, where r+s is 3 to 20, A represents a dehydroxylated residue of a polyhydric alcohol, and R represents a hydrogen atom or a methyl group.

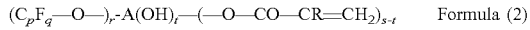

$$(C_pF_q\text{—O—})_r\text{-A(OH)}_t\text{—(—O—CO—CR=CH}_2)_{s-t} \qquad \text{Formula (2)}$$

In Formula (2), p represents an integer of 1 to 18, q represents an integer of 3 to 37, r represents an integer of 1 to 18, s represents an integer of 2 to 19, t represents an integer of 1 to 18, where r+s is 3 to 20, and s>t, A represents a dehydroxylated residue of a polyhydric alcohol, and R represents a hydrogen atom or a methyl group.

$C_pF_q$— in Formulae (1) and (2) means a hydrocarbon group containing one or more fluorine atoms, and as long as one or more fluorine atoms are contained, any of linear, branched, or cyclic hydrocarbon groups may be adopted, and a saturated or unsaturated hydrocarbon group may also be adopted. Among these, linear or branched fluoroalkyl group, fluoroalkenyl group, and fluorocycloalkyl group are preferable. p preferably represents 1 to 18, more preferably represents 2 to 12, and still more preferably represents 2 to 10. Examples thereof include a perfluoromethyl group, a difluoroethyl group, a perfluoroethyl group, a pentafluoropropyl group, a perfluoropropyl group, a perfluorooctyl group, a perfluorononyl group, a perfluorocyclopentyl group, and a perfluorocyclohexyl group. Alternatively, the following groups are also preferable (in the formula, * represents a bond).

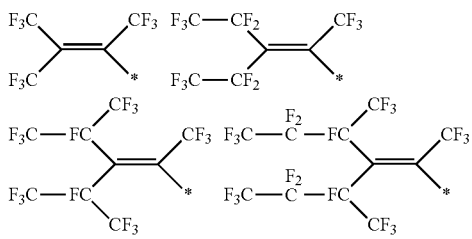

Among these, a perfluoro group in which all hydrogen atoms of hydrocarbons are substituted with fluorine atoms is preferable.

Examples of polyhydric alcohol used for A in Formulae (1) and (2) include pentaerythritol, dipentaerythritol, tripentaerythritol, glycerin, diglycerin, triglycerin, polyglycerin, sorbitol, mannitol, trimethylolpropane, ditrimethylolpropane, trimethylolethane, ditrimethylolethane, bis(dipentaethathritol)adipate, and tris(2-hydroxyethyl)isocyanurate; as well as adducts of alkylene (for example, ethylene, propylene, or butylene) oxide of these polyhydric alcohols; and ε-caprolactone modified products of these polyhydric alcohols.

The dehydroxylated residue refers to a group obtained by removing a hydrogen atom from the hydroxyl group of a polyhydric alcohol.

Examples of (meth)acrylate containing a fluorine atom-containing hydrocarbon group include a compound represented by Formula (1-1).

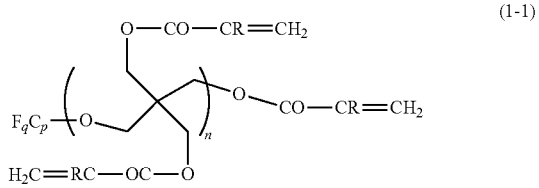

(In Formula (1-1), p, q, and R have the same meaning, n represents an integer of 1 to 5, preferably represents an integer of 1 to 3, and more preferably represents an integer of 1 or 2.)

The compound represented by Formula (1-1) includes a compound represented by Formula (1-2).

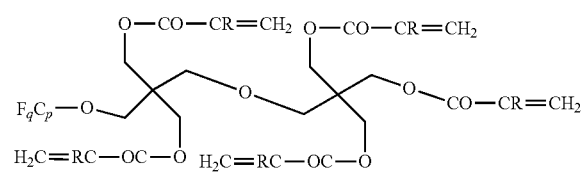

The (meth)acrylate containing a fluorine atom-containing hydrocarbon group is preferably bifunctional or higher, more preferably bi- or trifunctional, and particularly preferably trifunctional. The number of functional groups of the (meth)acrylate containing a fluorine atom-containing hydrocarbon group means the number of —O—CO—CR=CH$_2$ in one molecule.

Examples of the (meth)acrylate containing a fluorine atom-containing hydrocarbon group include triacryloyl pentafluoroethyl pentaerythritol, triacryloyl heptafluoroisopropyl pentaerythritol, triacryloyl heptadecafluorononenyl pentaerythritol, pentaacryloyl pentafluoroethyl dipentaerythritol, pentaacryloyl heptafluoroisopropyl dipentaerythritol, and pentaacryloyl heptafluorononenyl dipentaerythritol.

Examples of the (meth)acrylate further include compounds described in JP2003-313242A.

Specific examples of the monomer having a fluorine atom include the following compounds. The present invention is not limited to the following specific examples.

LINC-3A (manufactured by KYOEISHA CHEMICAL Co., Ltd.):

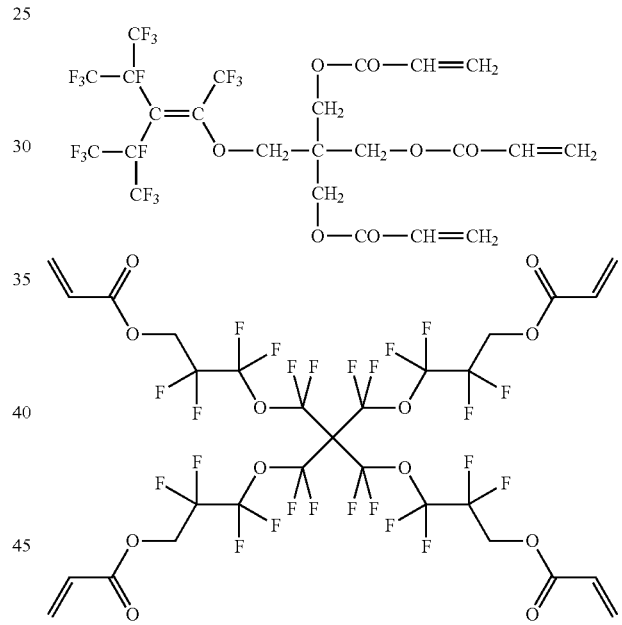

2,2,3,3,4,4,5,5-octafluoro-1,6-hexanediol diacrylate:

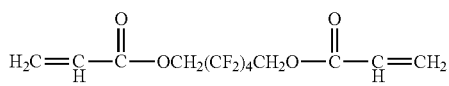

CHEMINOX FAAC 4 (manufactured by Unimatec Co., Ltd.):

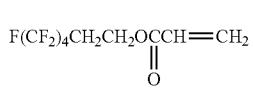

CHEMINOX FAAC 6 (manufactured by Unimatec Co., Ltd.):

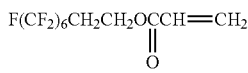

CHEMINOX FAMAC 4 (manufactured by Unimatec Co., Ltd.):

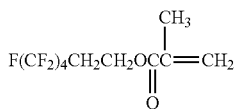

CHEMINOX FAMAC 6 (manufactured by Unimatec Co., Ltd.):

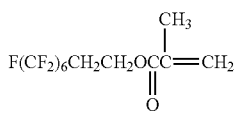

2,2,2-trifluoroethyl methacrylate:

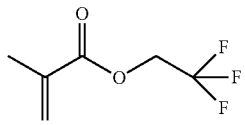

As the monomer having a fluorine atom, a fluorine-containing surfactant may be used.

As the fluorine-containing surfactant, known surfactants can be used. Among these, a fluorine-containing surfactant having an ultraviolet reactive group is preferably used.

Examples of the fluorine-containing surfactant having an ultraviolet reactive group include compounds described in paragraphs <0022> to <0025> of JP2016-011365A, the content of which is incorporated herein.

As the fluorine-containing surfactant, commercially available products can be used.

As a commercially available fluorine-containing surfactant, MEGAFACE RS-75 (manufactured by DIC Corporation, oligomer containing a fluorine group, a hydrophilic group, a lipophilic group and an ultraviolet reactive group) may be exemplified.

——Monomer Having Bromine Atom——

As the monomer having a bromine atom, compounds in which the fluorine atom is substituted with a bromine atom in Formulae (1) and (2) may be used.

Specific examples of the monomer having a bromine atom include tribromophenyl acrylate, and ethylene oxide (EO) modified tribromophenyl acrylate.

As the monomer having a bromine atom, commercially available products may be used. Examples of the commercially available monomers having a bromine atom include NEW FRONTIER BR-30 and BR-31 (trade name, manufactured by Dai-ichi Kogyo Seiyaku Co., Ltd.).

(II) Second Preferable Embodiment of Protective Layer

In the second preferable embodiment of the protective layer, the resin of the protective layer preferably include resins other than the halogen atom-containing resin. According to the second preferable embodiment of the protective layer, gas permeability can be enhanced while toluene separation selectivity is lowered compared to the first preferable embodiment of the protective layer.

However, also in the second preferable embodiment of the protective layer, the halogen atom-containing resin (for example, fluorine atom-containing resin) may be included.

In the second preferable embodiment of the protective layer, in the gas separation membrane according to the embodiment of the present invention, it is preferable that 50 atomic % or more of the composition of the protective layer is constituted of a carbon atom, a hydrogen atom, a nitrogen atom, and an oxygen atom, it is more preferable that 90 atomic % or more of the composition thereof is constituted of a carbon atom, a hydrogen atom, a nitrogen atom, and an oxygen atom, and it is particularly preferable that 95 atomic % or more of the composition thereof is constituted of a carbon atom, a hydrogen atom, a nitrogen atom, and an oxygen atom.

In the second preferable embodiment of the protective layer, in the gas separation membrane according to the embodiment of the present invention, the halogen atom content (particularly, fluorine atom content) in the composition of the protective layer is preferably less than 50 atomic %, more preferably less than 10 atomic %, and particularly preferably less than 5 atomic %.

——Resins Other than Halogen Atom-Containing Resin——

In the second preferable embodiment of the protective layer, as the resin of the protective layer, resins other than the halogen atom-containing resin are preferably used.

Examples of resins other than the halogen atom-containing resin to be used for the protective layer include resins obtained by polymerizing and/or crosslinking monomers other than the halogen atom-containing monomer.

Monomers other than the halogen atom-containing monomer will be described.

——Monomers Other than Halogen Atom-Containing Monomer——

In the second preferable embodiment of the protective layer, as the monomer used for forming the resin of the protective layer, monomers other than the halogen atom-containing monomer are preferably used.

However, also in the second preferable embodiment of the protective layer, as the monomer used for forming the resin of the protective layer, monomers other than the halogen atom-containing monomer may be used.

Examples of monomers other than the halogen atom-containing monomer include an acrylic monomer such as acrylic acid and acrylate ester; and a silicone acrylate-based monomer.

As the acrylic monomer, a compound represented by Formula (3) below is preferable.

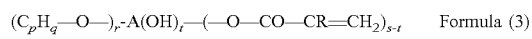

In Formula (3), p represents an integer of 1 to 18, q represents an integer of 3 to 37, r represents an integer of 1 to 18, s represents an integer of 2 to 19, t represents an integer of 1 to 18, where r+s is 3 to 20 and s>t, A represents a dehydroxylated residue of a polyhydric alcohol, and R represents a hydrogen atom or a methyl group.

The preferable range of each group of Formula (3) is the same as the preferable range of each group of Formulae (1) and (2).

Specific examples of the acrylic monomer include compounds described in paragraph <0048> of JP2013-67110A, the content of which is incorporated in the present specification. Specific examples of the acrylic monomer include phenol EO modified acrylate, nonylphenol EO modified acrylate, nonylphenol propylene oxide (PO) modified acrylate, 2-ethylhexyl EO modified acrylate, N-acryloyloxyethyl hexahydrophthalimide, bisphenol F EO modified diacrylate, bisphenol A EO modified diacrylate, isocyanuric acid EO modified diacrylate, polypropylene glycol diacrylate, polyethylene glycol diacrylate, trimethylolpropane triacrylate (TMPTA), trimethylolpropane PO modified triacrylate, trimethylolpropane EO modified triacrylate, isocyanuric acid EO modified triacrylate, ε-caprolactone modified tris (acroxyethyl) isocyanurate, pentaerythritol triacrylate (PETA), pentaerythritol tri- and tetraacrylate, ditrimethylolpropane tetraacrylate, dipentaerythritol penta- and hexaacrylate, ω-carboxy-polycaprolactone monoacrylate, phthalic acid monohydroxyethyl acrylate, and polyester acrylate. These acrylates may be used alone or in combination of two or more thereof. Examples of commercially available acrylic monomers include ARONIX series (ARONIX M-305, M-309, and the like) manufactured by TOAGOSEI CO., LTD.

Specific examples of the silicone acrylate-based monomer, SILAPLANE (registered trademark) FM-0611, SILAPLANE FM-0621, and SILAPLANE FM-0625, both terminal (meth)acrylic SILAPLANE FM-7711, SILAPLANE FM-7721, SILAPLANE FM-7725, and the like, SILAPLANE FM-0411, SILAPLANE FM-0421, SILAPLANE FM-0428, SILAPLANE FM-DA11, SILAPLANE FM-DA21, and SILAPLANE-DA25, single terminal (meth) acrylic SILAPLANE FM-0711, SILAPLANE FM-0721, SILAPLANE FM-0725, SILAPLANE TM-0701, SILAPLANE TM-0701T, and the like, manufactured by JNC Corporation.

(Polymerization Initiator)

In a case where the resin of the protective layer is synthesized by the reaction initiated or promoted by photoexcitation, as the material of the protective layer, known photopolymerization initiators, radical polymerization initiators, and curing agents are preferably used.

As the photopolymerization initiator and the radical polymerization initiator, compounds described in paragraph <0036> of JP2013-111565A may be exemplified, the content of which is incorporated herein.

Examples of known photopolymerization initiator and radical polymerization initiators include benzoin ether, 2,2-dimethoxy-1,2-diphenylethane-1-one [IRGACURE 651, manufactured by BASF, trade name], 1-hydroxy-cyclohexyl-phenyl-ketone [IRGACURE 184, manufactured by BASF, trade name], 2-hydroxy-2-methyl-1-phenyl-propane-1-one [DAROCUR 1173, manufactured by BASF, trade name], 1-[4-(2-hydroxyethoxy)-phenyl]-2-hydroxy-2-methyl-1-propane-1-one [IRGACURE 2959, manufactured by BASF, trade name], 2-hydroxy-1-[4-[4-(2-hydroxy-2-methyl-propionyl)-benzyl]phenyl]-2-methyl-propane-1-one [IRGACURE 127, manufactured by BASF, trade name], 2-methyl-1-(4-methylthiophenyl)-2-morpholinopropane-1-one [IRGACURE 907, manufactured by BASF, trade name], 2-benzyl-2-dimethylamino-1-(4-morpholinophenyl)-butanone-1 [IRGACURE 369, manufactured by BASF, trade name], 2-(dimethylamino)-2-[(4-methylphenyl)methyl]-1-[4-(4-monopholinyl)phenyl]-butanone [IRGACURE 379, manufactured by BASF, trade name], 2,4,6-trimethylbenzoyl-diphenyl-phosphineoxide [DAROCUR TPO, manufactured by BASF, trade name], bis(2,4,6-trimethylbenzoyl)-phenylphosphine oxide [IRGACURE 819, manufactured by BASF, trade name], bis($\eta^5$-2,4-cyclopentadien-1-yl)-bis(2,6-difluoro-3-(1H-pyrrol-1-yl)-phenyl) titanium [IRGACURE 784, manufactured by BASF, trade name], 1,2-octanedione, 1[4-(phenylthio)-,2-(O-benzoyl oxime)] [IRGACURE OXE-01, manufactured by BASF, trade name], ethanone, 1-[9-ethyl-6-(2-methylbenzoyl)-9H-carbazole-3-yl]-, and 1-(O-acetyl oxime) [IRGACURE OXE-02, manufactured by BASF, trade name].

Further, the photopolymerization initiators and radical polymerization initiators also include a photoacid generator. Examples of the photoacid generator include UV9380C (bis(4-dodecylphenyl)iodonium hexafluoroantimonate, manufactured by Momentive Performance Materials Inc.).

As the curing agent, isocyanates can be used, and an isocyanurate group-containing polyisocyanate is preferable. As the isocyanates, the compounds described in paragraphs <0022> to <0030> of JP2015-113415A may be exemplified, the content of which is incorporated herein.

Examples of known curing agents include "DURANATE TPA-100", "DURANATE TKA-100", and "DURANATE TLA-100", manufactured by Asahi Chemical Corp, "SUMIDULE N3300", "DESMODUR N3600", "DESMODUR N3790BA", "DESMODUR N3900", and "DESMODUR Z4470BA", manufactured by Sumika Bayer Urethane Co., Ltd., "TAKENATE D-170N", manufactured by Mitsui Chemicals, Inc., "BURNOCK DN-980", "BURNOCK DN-981", "BURNOCK DN-990", and "BURNOCK DN-992", manufactured by DIC Corporation, and "CORONATE HX", "CORONATE HXR", and "CORONATE HXLV", manufactured by Nippon Polyurethane Industry Co., Ltd.

The concentration of solid contents of the polymerization initiator is preferably 25% by mass or less, more preferably 0.1% to 15% by mass, and particularly preferably 1% to 10% by mass with respect to the resin precursor (resin or monomer) used for the protective layer.

These polymerization initiators can be used alone or in combination of two or more thereof.

(Additive)

As the material of the protective layer, it is preferable that a solvent, a polymerization inhibitor, an acid (for example, acetic acid), and the like is used.

The content ratios of the resin precursor of the protective layer and each additive are not particularly limited. For example, it is preferable that the mass ratio of the contained resin precursor of the protective layer is 1% to 20%, the mass ratio of the contained solvent is 50% to 95%, the mass ratio of the contained polymerization inhibitor is 0.01% to 5%, and the mass ratio of contained acetic acid in a case of using acetic acid as an acid is 0.1% to 5%.

(Solvent)

It is preferable that the material of the protective layer is prepared as a composition including an organic solvent in a case of forming the protective layer.

In a case where the protective layer is formed by polymerization reaction or a crosslinking reaction, it is preferable that the material is prepared as a composition for forming a protective layer precursor. It is preferable that the composition for forming a protective layer precursor is prepared as the composition which can react according to a sol-gel method.

The solvent used for forming the protective layer is not particularly limited, and examples thereof include n-heptane, acetic acid, water, n-hexane, 2-butanone, methanol, ethanol, isopropyl alcohol, cyclohexanone, acetone, and dimethyl sulfoxide (DMSO).

<Second Protective Layer>

The gas separation membrane according to the embodiment of the present invention preferably further has a second protective layer, and preferably has the support, the resin layer, the separation layer, the protective layer and the second protective layer in this order.

It is preferable that the second protective layer further includes a compound having a siloxane bond in the gas separation membrane according to the present invention.

It is preferable that the second protective layer is a layer to be provided on the protective layer. At the time of handling or use, unintended contact between the above-described protective layer and another material can be prevented.

It is preferable that the second protective layer is a layer provided separately from the protective layer.

(Material)

The material of the second protective layer is not particularly limited.

As the material used for the second protective layer, the material the same as the resin contained in the resin layer can be used. Examples of the material used for the second protective layer include silicone resin, polyimide, cellulose resin, and polyethylene oxide.

Further, the second protective layer may contain a filler. The filler used for the second protective layer is not particularly limited. As the filler used for the second protective layer, inorganic particles described in paragraphs <0020> to <0027> of JP2015-160201A can be preferably used, and the contents of this publication are incorporated herein by reference.

It is preferable that the second protective layer in the gas separation membrane according to the embodiment of the present invention includes a compound having a siloxane bond. In this case, the content of the compound having a siloxane bond in the second protective layer is preferably 50% by mass or more, more preferably 90% by mass or more, and particularly preferably 99% by mass or more. It is more particularly preferable that the second protective layer is formed of only the compound having a siloxane bond.

The compound having a siloxane bond may be a compound having a repeating unit containing at least a silicon atom, an oxygen atom or a carbon atom. Further, the compound having a siloxane bond may be a "compound having a siloxane bond and having a repeating unit" and of these, is preferably a compound having a polysiloxane unit. That is, the compound having a siloxane bond is preferably a silicone resin.

As examples of the silicone resin used for the second protective layer, it is preferable that the protective layer contains at least one selected from polydimethylsiloxane (hereinafter, also referred to as PDMS), polydiphenyl siloxane, polydi(trifluoropropyl)siloxane, polymethyl(3,3,3-trifluoropropyl)siloxane, and poly(l-trimethylsilyl-1-propyne) (hereinafter, also referred to as PTMSP). It is more preferable that the silicone resin used for the second protective layer contains polydimethylsiloxane or poly(l-trimethylsilyl-1-propyne). In the gas separation membrane according to the present invention, the compound having a siloxane bond of the second protective layer is particularly preferably polydimethylsiloxane.

The hardness of the silicone resin such as PDMS used for the second protective layer is 0.7 or less and is small. In the preferable embodiment of the present invention, by forming the protective layer into a film having high hardness, in the handling of the module until a spiral type module is prepared, a defect can be remarkably reduced. Particularly, it is preferable to greatly improve rub resistance by forming the protective layer as a crosslinked film.

Commercially available materials can be used as examples of the silicone resin used for the second protective layer. For example, UV9300 (polydimethylsiloxane (PDMS), manufactured by Momentive Performance Materials Inc.), X-22-162C (manufactured by Shin-Etsu Chemical Co., Ltd.), and the like can be preferably used.

The silicone resin used for the second protective layer can be prepared as a composition containing an organic solvent during formation of the second protective layer, and it is preferable that the composition is a curable composition. The organic solvent which can be used for forming the second protective layer containing a silicone resin is not particularly limited, and examples thereof include n-heptane.

(Characteristics)

The thickness of the second protective layer can be, for example, 50 to 4000 nm. In the gas separation membrane according to the embodiment of the present invention, the thickness of the second protective layer is preferably 100 to 3200 nm from the viewpoint of achieving both of rub resistance and gas permeability, and more preferably 100 to 1000 nm.

In the field of water separation for which high durability is further required than the field of the gas separation membrane, due to the thickness being thick, the gas separation membrane is less affected by damage, and thus the second protective layer can be omitted. On the contrary, in a case where the thickness of the separation layer is thin (for example, in a case of 500 nm or less), the gas separation membrane is easily affected by damage. Therefore, in the field of the gas separation membrane including the present invention, it is preferable to make the membrane thin to the extent that the gas permeability can be increased as much as possible while the rub resistance is held.

<Characteristics and Applications>

The gas separation membrane according to the embodiment of the present invention can be suitably used for a gas separation recovery method and a gas separation purification method. For example, a gas separation membrane which is capable of efficiently separating specific gas from a gas mixture containing gas, for example, hydrogen, helium, carbon monoxide, carbon dioxide, hydrogen sulfide, oxygen, nitrogen, ammonia, a sulfur oxide, or a nitrogen oxide; hydrocarbon such as methane, or ethane; unsaturated hydrocarbon such as propylene; or a perfluoro compound such as tetrafluoroethane can be obtained.

It is preferable that the gas separation membrane according to the embodiment of the present invention is used to separate at least one kind of acidic gas from a gas mixture of acidic gas and non-acidic gas. Examples of the acidic gas include carbon dioxide, hydrogen sulfide, carbonyl sulfide, a sulfur oxide ($SO_X$), and a nitrogen oxide ($NO_X$). Among these, at least one selected from carbon dioxide, hydrogen sulfide, carbonyl sulfide, a sulfur oxide ($SO_X$), and a nitrogen oxide ($NO_X$) is preferable; carbon dioxide, hydrogen sulfide, or a sulfur oxide ($SO_X$) is more preferable; and carbon dioxide is particularly preferable.

As the non-acidic gas, at least one selected from hydrogen, methane, nitrogen, and carbon monoxide is preferable; methane or hydrogen is more preferable, and methane is particularly preferable. In the gas separation membrane according to the embodiment of the present invention, even in a case where BTX (benzene, toluene, xylene) or a higher order hydrocarbon gas such as propane, butane, or hexane is included as the non-acidic gas, at least one acidic gas can be separated from the gas mixture of acidic gas and non-acidic gas. In particular, in the gas separation membrane according to the embodiment of the present invention, also in a case where propane is included as non-acidic gas, in the separation of at least one acidic gas from the gas mixture of acidic gas and non-acidic gas, variation in separation selectivity can be reduced.

It is preferable that the gas separation membrane according to the embodiment of the present invention selectively separates carbon dioxide from the gas mixture including particularly carbon dioxide, hydrocarbon (methane), and higher order hydrocarbon(propane). In addition, it is more preferable that the gas separation membrane according to the embodiment of the present invention is used for selective separation of carbon dioxide from the gas mixture including carbon dioxide, hydrocarbon (methane), and higher order hydrocarbon (toluene).

In addition, in a case where gas subjected to a separation treatment is mixed gas of carbon dioxide and methane, the permeation rate of the carbon dioxide at 30° C. and 5 MPa is preferably 10 GPU or greater, more preferably 10 to 300 GPU, and particularly preferably f 15 to 300 GPU.

Further, 1 GPU is $1 \times 10^{-6}$ cm$^3$(STP)/cm$^2 \cdot$sec$\cdot$cmHg.

In the case where the gas separation membrane according to the embodiment of the present invention is a membrane in which the gas subjected to a separation treatment is mixed gas of carbon dioxide and methane, a gas separation selectivity a which is a ratio of the permeation flux of carbon dioxide at 30° C. and 5 MPa to the permeation flux of methane is preferably 30 or greater, more preferably 35 or greater, particularly preferably 40 or greater, and more particularly preferably greater than 50.

<Method of Producing Gas Separation Membrane>

A method of producing a gas separation membrane is not particularly limited.

(Formation of Resin Layer)

It is preferable that the method of producing a gas separation membrane includes a step of forming a resin layer on a support.

A method of forming the resin layer on the support is not particularly limited, and it is preferable to apply a composition including the material of the resin layer and an organic solvent. The coating method is not particularly limited and a known method can be used. For example, a spin coating method, a dip coating method, or a bar coating method can be used as appropriate.

It is preferable that the composition the material of the resin layer and an organic solvent is a curable composition. There is no particular limitation on a method of irradiating the curable composition with radiation in a case of forming the resin layer, but irradiation with an electron beam, an ultraviolet (UV) ray, visible light, or an infrared ray can be used, and radiation can be appropriately selected depending on the material to be used.

It is preferable that the radiation irradiation time is 1 to 30 seconds.

It is preferable that the radiation energy is 10 to 500 mW/cm$^2$.

After forming the resin layer on the support, it is preferable to perform a specific treatment on the resin layer before forming the separation layer. As a specific treatment to be applied to the resin layer, an oxygen atom permeation treatment of causing oxygen atoms to permeate into the resin layer is preferable, and a plasma treatment is more preferable.

From the viewpoint of enhancing separation selectivity and enhancing rub resistance to make it difficult to lower the separation selectivity, it is more preferable to perform a plasma treatment for 5 seconds or more under the above conditions. On the other hand, it is preferable to perform the plasma treatment for 1000 seconds or less under the above conditions.

In addition, the cumulative energy amount of the plasma treatment is preferably 25 to 500000 J.

The plasma treatment can be performed by a conventional method. Conventionally, a state in which a treatment object is treated in a large vacuum chamber using a decompression plasma to generate a stable plasma can be exemplified. Recently, an atmospheric pressure plasma treatment device capable of performing processing under an atmospheric pressure atmosphere has been developed. In this case, a gas mainly containing an argon gas is introduced into the process chamber, and the high density plasma can be stably generated under the atmospheric pressure atmosphere. The system configuration of the atmospheric pressure plasma treatment device includes a gas mixing and control section, a reactor, and a transport conveyor (or XY table). A proposal is also made for one for intermittently blowing a plasma jet off from a circular nozzle to perform treatment.

As the plasma treatment condition, the argon flow rate is preferably 5 to 500 cm$^3$(STP)/min, more preferably 50 to 200 cm$^3$(STP)/min, and particularly preferably 80 to 120 cm$^3$(STP)/min. The oxygen flow rate is preferably 1 to 100 cm$^3$(STP)/min and more preferably 5 to 100 cm$^3$(STP)/min. STP is abbreviation of standard temperature and pressure.

As the plasma treatment condition, the degree of vacuum is preferably 0.6 to 15 Pa.

As the plasma treatment condition, the discharge output is preferably 5 to 200 W.

(Formation of Separation Layer)

A method of forming the separation layer is not particularly limited, and the separation layer may be formed by obtaining a commercially available product of a known material, may be formed according to a known method, or may be formed according to a method described below using a specific resin.

The method of forming the separation layer is not particularly limited, but, it is preferable that an underlayer (for example, a support or a resin layer) is coated with the composition including the material of the separation layer and an organic solvent. The coating method is not particularly limited and the coating can be performed according to a known method, for example, a spin coating method.

The condition for forming the separation layer is not particularly limited and the temperature is preferably −30° C. to 100° C., more preferably −10° C. to 80° C., and particularly preferably 5° C. to 50° C.

(Formation of Protective Layer)

The method of forming the protective layer is not particularly limited. The protective layer may be formed by using a known material, by a known method, or by a method of using a specific resin described later.

The method of forming the protective layer is not particularly limited but a composition including the material of the protective layer and an organic solvent is preferably applied to an underlayer (for example, the support or the resin layer). The coating method is not particularly limited and a known method can be used. For example, the coating can be performed using a spin coating method.

The condition for forming the protective layer of the gas separation membrane is not particularly limited but the temperature is preferably −30° C. to 100° C., more preferably −10° C. to 80° C., and particularly preferably 5° C. to 50° C.

It is preferable that the protective layer is formed by crosslinking. In a case where the protective layer is formed by crosslinking, it is preferable that the protective layer is formed of a composition for forming a protective layer including a resin precursor (resin and/or monomer) and a polymerization initiator having a concentration of solid contents of 3% to 20% by mass with respect to the resin precursor.

(Formation of Second Protective Layer)

The method of forming the second protective layer on the surface-treated surface of the protective layer is not particularly limited, but it is preferable to coat the surface with the composition including the material of the protective layer and an organic solvent. Examples of the organic solvent include organic solvents used for forming the separation layer. The coating method is not particularly limited and a known method can be used. For example, the coating can be performed using a spin coating method.

Although a method of irradiating the curable composition for forming a second protective layer with radiation is not particularly limited, an electron beam, an ultraviolet (UV) ray, visible light, or an infrared ray can be used, and radiation can be appropriately selected depending on the material to be used.

It is preferable that the radiation irradiation time is 1 to 30 seconds.

It is preferable that the radiation energy is 10 to 500 mW/cm$^2$.

<Method of Separating Gas Mixture>

It is possible to perform separation of a gas mixture by using the gas separation membrane according to the embodiment of the present invention.

In the method of separating a gas mixture using the gas separation membrane according to the embodiment of the present invention, the components of the gas mixture of raw materials are affected by the production area of the raw materials, the applications, or the use environment and are not particularly defined. However, it is preferable that the main components of the gas mixture are carbon dioxide and methane, carbon dioxide and nitrogen, or carbon dioxide and hydrogen, and BTX (benzene, toluene, xylene) and a higher order hydrocarbon gas such as propane, butane, or hexane are included as impurities.

In a case where the gas mixture is present in the coexistence of an acidic gas such as carbon dioxide or hydrogen sulfide, the method of separating the gas mixture using the gas separation membrane according to the embodiment of the present invention exhibits particularly excellent performance. Preferably, the method thereof exhibits excellent performance at the time of separating carbon dioxide and hydrocarbon such as methane, carbon dioxide and nitrogen, or carbon dioxide and hydrogen.

It is preferable that the gas separation membrane according to the embodiment of the present invention allows carbon dioxide to selectively permeate from the mixed gas including carbon dioxide gas other than carbon dioxide. It is preferable that the method of separating a gas mixture includes a process of allowing carbon dioxide to selectively permeate from the mixed gas including carbon dioxide and methane. The pressure during gas separation is preferably 3 MPa to 10 MPa, more preferably 4 MPa to 7 MPa, and particularly preferably of 5 MPa to 7 MPa. Further, the temperature during gas separation is preferably −30° C. to 90° C. and more preferably 15° C. to 70° C.

[Gas Separation Membrane Module]

A gas separation membrane module of the present invention has the gas separation membrane according to the embodiment of the present invention.

Examples of the gas separation membrane module include a spiral type module, a hollow fiber type module, a pleated module, a tubular module, and a plate & frame type module.

The gas separation membrane module may be produced by being cut out from the gas separation membrane in a roll shape.

[Gas Separation Device]

A gas separation device according to an embodiment of the present invention includes has the gas separation membrane module according to the embodiment of the present invention.

As the gas separation device according to the embodiment of the present invention, a gas separation device having means for performing separation and recovery of gas or performing separation and purification of gas can be obtained.

The gas separation device according to the embodiment of the present invention may be applied to a gas separation and recovery device which is used together with an absorption liquid described in JP2007-297605A according to a membrane/absorption hybrid method.

EXAMPLES

The characteristics of the present invention will be described in detail with reference to Examples and Comparative Example (Comparative Example do not correspond to known techniques) described below. The materials, the amounts to be used, the ratios, the treatment contents, and the treatment procedures shown in the examples described below can be appropriately changed as long as it is within the gist of the present invention. Accordingly, the scope of the present invention should not be limitatively interpreted by the specific examples described below.

Moreover, "part" and "%" in the sentences are on a mass basis unless otherwise noted.

Comparative Example 1

<Preparation of Resin Layer>

(Preparation of Radiation Curable Polymer Having Dialkylsiloxane Group)

An n-heptane solution including 39.087% by mass of commercially available UV9300 (polydimethylsiloxane (PDMS) having the following structure, manufactured by Momentive Performance Materials Inc., the epoxy equivalent weight was 950 g/mol of oxirane, and the weight-average molecular weight obtained by using a viscosity measurement method was 9000), 10.789% by mass of commercially available X-22-162C (both terminal carboxyl modified silicone having the following structure, manufactured by Shin-Etsu Chemical Co., Ltd., weight-average molecular weight: 4600), and 0.007% by mass of DBU (1,8-diazabicyclo[5.4.0]undec-7-ene) was prepared in a three-neck flask. The solution was maintained at 95° C. for 168 hours, thereby obtaining a radiation curable polymer solution (viscosity of 22.8 mPa·s at 25° C.) having a poly(siloxane) group.

UV9300 (Chemical Abstracts Service: CASNo.: 67762-95-2)

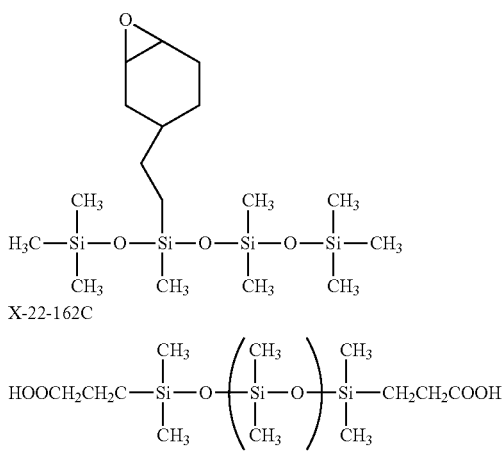

(Preparation of Polymerizable Radiation Curable Composition)

The radiation curable polymer solution was cooled to 20° C. and was diluted with addition of n-heptane until the concentration reached 5% by mass. The obtained solution was filtered using a filter paper having a filtration accuracy of 2.7 μm to prepare a radiation curable composition. 3% by mass of UV9380C (45% by mass of bis(4-dodecylphenyl) iodonium hexafluoroantimonate, manufactured by Momentive Performance Materials Inc., alkyl glycidyl ether solution) as a photopolymerization initiator and 0.1% by mass of Ti(OiPr)$_4$ (titanium (IV) isopropoxide manufactured by Dorf Ketal Chemicals) were added to the radiation curable composition, thereby preparing a polymerizable radiation curable composition.

(Coating Porous Support with Polymerizable Radiation Curable Composition and Formation of Resin Layer)

A polyacrylonitrile (PAN) porous membrane (the polyacrylonitrile porous membrane was present on non-woven fabric, the thickness of the film including the non-woven fabric was approximately 180 μm) was used as a support, and the support was spin-coated with the polymerizable radiation curable composition, subjected to a UV treatment (Light Hammer 10, manufactured by Fusion UV System Corporation, D-VALVE) under the conditions of a UV intensity of 24 kW/m for a treatment time of 10 seconds, and then dried. In this manner, a resin layer having a thickness of 600 nm was formed on the porous support.

<Preparation of Separation Layer>

(Synthesis of Polyimide (P-02))

Diamine 1 used for synthesis of polyimide (P-02) was synthesized in the following reaction scheme.

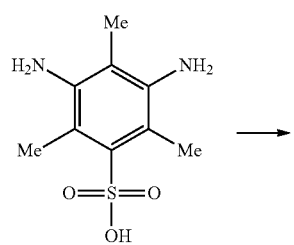

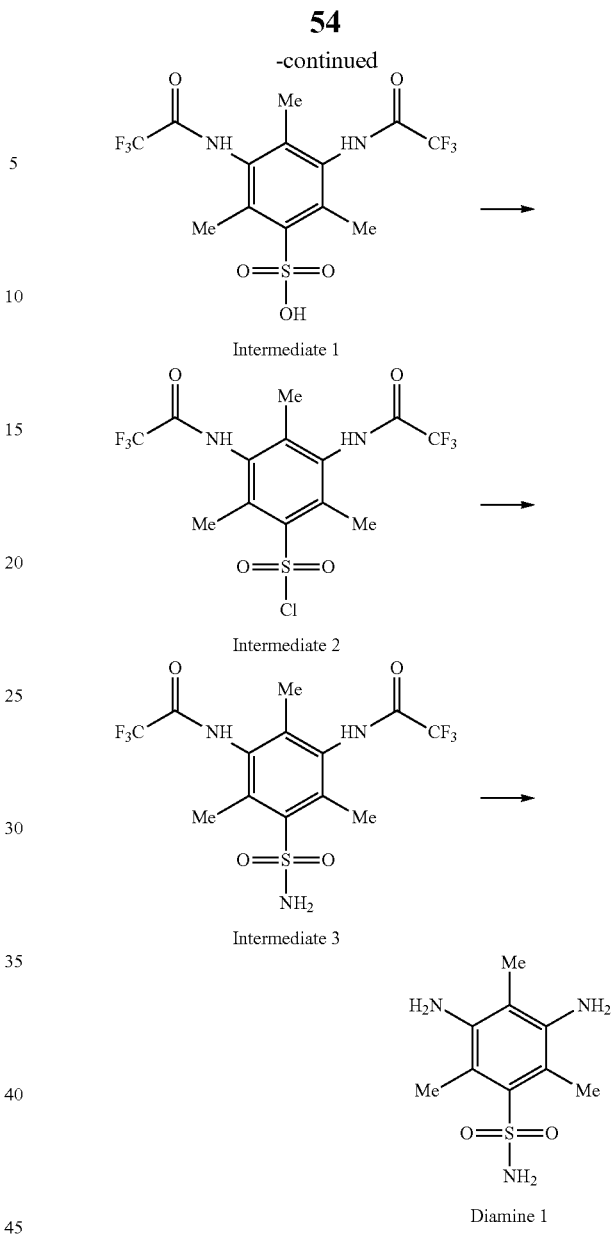

(Synthesis of Intermediate 1)

Diaminocyclohexylphosphoric acid (manufactured by Wako Pure Chemical Industries, Ltd.) (60 g), acetonitrile (manufactured by Wako Pure Chemical Industries, Ltd.) (380 g), and pyridine (manufactured by Wako Pure Chemical Industries, Ltd.) (23 g) were placed in a flask. Trifluoroacetic acid anhydride (115 g) (manufactured by Wako Pure Chemical Industries, Ltd.) was carefully added dropwise under cooling with ice, and the mixture was allowed to react at 70° C. for 2 hours. After cooling, methanol (manufactured by Wako Pure Chemical Industries, Ltd.) (30 g) was added thereto and the mixture was stirred for 1 hour. After concentration under reduced pressure, purification was performed using hydrochloric acid to obtain an intermediate 1 (110 g).

(Synthesis of Intermediate 2)

Acetonitrile (manufactured by Wako Pure Chemical Industries, Ltd.) (440 mL) and the intermediate 1 (68 g) were placed in a flask. After thionyl chloride (manufactured by Wako Pure Chemical Industries, Ltd.) (115 g) and dimethylformamide (manufactured by Wako Pure Chemical Industries, Ltd.) (0.9 g) were carefully added thereto, the internal temperature was raised to 70° C. while paying attention to heat generation and foaming. After distillation under reduced pressure, the reaction mixture was poured into ice, and the precipitate was purified to obtain an intermediate 2 (65 g).

(Synthesis of Intermediate 3)

Ammonia water (manufactured by Wako Pure Chemical Industries, Ltd.) (90 g) was placed in a flask. A solution obtained by suspending the intermediate 2 (43 g) in tetrahydrofuran (manufactured by Wako Pure Chemical Industries, Ltd.) (130 g) was carefully added to thereto under cooling with ice. After stirring was performed at 40° C. for 2 hours, the mixture was concentrated under reduced pressure and then purified to obtain an intermediate 3 (30 g).

(Synthesis of Diamine 1)

The intermediate 3 (30 g), methanol (manufactured by Wako Pure Chemical Industries, Ltd.) (100 g) were placed in a 200 mL flask. Methanesulfonic acid (manufactured by Wako Pure Chemical Industries, Ltd.) (30 g) was carefully added to thereto, the temperature was raised while paying attention to heat generation, and stirring was performed at 120° C. for 30 minutes. After cooling, the reaction solution was poured into a potassium carbonate solution, and the precipitate was purified to obtain diamine 1 (11 g).

(Synthesis of Polyimide (P-02))

Metacresol (manufactured by Wako Pure Chemical Industries, Ltd.) (100 g), diamine 1 (9.00 g), 3,5-diaminobenzoic acid (manufactured by Tokyo Chemical Industry Co., Ltd.) (0.66 g), and 6FDA (manufactured by Tokyo Chemical Industry Co., Ltd.) (19.37 g) were placed in a flask. After toluene (manufactured by Wako Pure Chemical Industries, Ltd.) (10 g) and isoquinoline (manufactured by Wako Pure Chemical Industries, Ltd.) (1.5 g) were added thereto, the mixture was heated to 180° C. and allowed to react for 6 hours. After cooling, the resultant was diluted with acetone (manufactured by Wako Pure Chemical Industries, Ltd.) and then isopropyl alcohol (manufactured by Wako Pure Chemical Industries, Ltd.) was added thereto to obtain a polymer as a solid. The same reprecipitation was repeated twice, followed by drying at 80° C. to obtain polyimide (P-02) (22 g).

Polyimide (P-02)

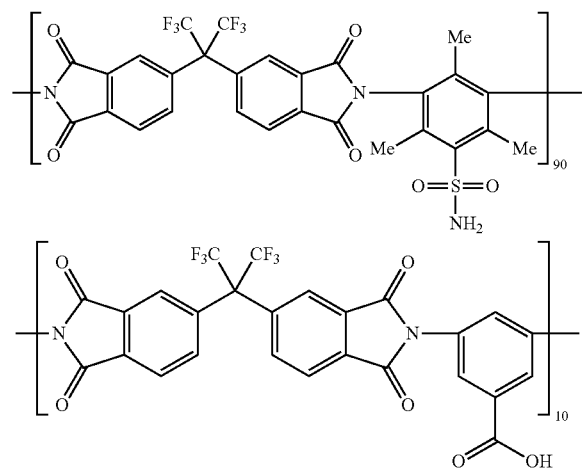

(Formation of Separation Layer)

For a laminate in which a resin layer having a thickness of 600 nm was formed on the porous support, a plasma treatment was performed on the resin layer for 5 seconds under plasma treatment conditions of an oxygen flow rate of 50 cm³(STP)/min, an argon flow rate of 100 cm³(STP)/min, and a discharge output of 10 W.

1.4 g of polyimide (P-02) having a reactive group and 8.6 g of methyl ethyl ketone were mixed in a brown vial and the mixture was stirred at 25° C. for 30 minutes to prepare a solution for forming a separation layer.

Thereafter, the stirred solution for forming a separation layer was applied to the plasma-treated surface of the resin layer and dried to form a separation layer having a thickness of 100 nm.

<Formation of Protective Layer>

Thereafter, the polymerizable radiation curable composition used for the formation of the resin layer was applied on the separation layer and then subjected to a UV treatment under the same UV treatment conditions as in the formation of the resin layer. Thus, a protective layer having a thickness of 600 nm was formed and dried on the separation layer at 50° C.

The obtained gas separation membrane was used as a gas separation membrane of Comparative Example 1.

<Maximum Value of Silicon Atom Content in Composition of Half Area of Separation Layer on Protective Layer Side>

The maximum value of the silicon atom content of the composition of the half area of the separation layer on the protective layer side was measured in the same manner as in the calculation of the atom content of each atom of the protective layer described later. Specifically, the silicon atom content was measured in an area of 300 μm×300 μm in each area at every 10 nm etching to the half area of the separation layer on the protective layer side in the thickness direction using electron spectroscopy for chemical analysis (ESCA), and the maximum value of the silicone atom content in the half area of the separation layer on the protective layer side (the maximum value in the thickness direction) was obtained. The results are shown in Table 1 below.

In the present specification, by utilizing the fact that the atom content (compositional ratio) of any atom configuring each layer is different in each layer, from the gas separation membrane of each of Examples and Comparative Example as a composite membrane, specification of the layer and specification of the interface between the two layers can be performed. The interface between an arbitrary layer A and an arbitrary layer B of a laminate is set to a middle point of the layer in the thickness direction in the area of the slope of a graph in a case where the graph is created with the vertical axis as the atom content of any atom and the horizontal axis as a length of the layer in the thickness direction by measuring the composition of the laminate in the thickness direction using ESCA and etching in the same manner as in the calculation of the atom content of each atom of the protective layer described later. In regard to the atom focused in a case where specification of the layer and specification of the interface between the two layers are performed, the preferential order is a carbon atom, a nitrogen atom, an oxygen atom, and a fluorine atom. First, specification of the layer and specification of the interface between the two layers are performed by focusing on the atom with high priority. Next, in a case where there is no slope in the graph (the atomic contents of the focused atom between the two layers are about the same) and the specification cannot be performed even when focusing on the atom with high priority, an operation of performing specification of the layer and specification of the interface between the two layers is performed by focusing on the atom with the next high priority. This operation is repeatedly performed until the specification of the layer and the specification of the interface between the two layers can be made.

<Composition of Protective Layer>

The center of the obtained gas separation membrane was sampled and the atom content of the protective layer was calculated using ESCA.

The gas separation membrane having the support, the resin layer, the separation layer, and the protective layer was placed into Quantera SXM manufactured by Physical Electronics, Inc. Under the conditions of an X-ray source: Al-Kα ray (1490 eV, 25 W, diameter: 100 μm), a measurement area: 300 μm×300 μm, a pass energy: 55 eV, and a step: 0.05 eV, the atom content of each atom of the surface of the protective layer was calculated. The surface of the protective layer where the atom content is measured is the surface of the protective layer opposite to the support, that is, the surface of the protective layer opposite to the separation layer.

Subsequently, etching was performed using $C_{60}$ ions to obtain the atom content of each atom in each area from the surface of the protective layer in the thickness direction. That is, 70 nm etching was performed in an area of 2 mm×2 mm in the thickness direction by using a $C_{60}$ ion gun attached to Quantera SXM manufactured by Physical Electronics, Inc. and setting the ion beam intensity to $C_{60}^+$: 10 keV, and 10 nA. In the membrane, the atom content of each atom in the area at 40 nm from the surface of the protective layer in the thickness direction was calculated using an ESCA device. The depth of the protective layer from the surface of the protective layer to the area where the atom content of each atom was measured was calculated from an etching rate of 10 nm/min of the protective layer material. This value can be obtained each time the material is changed and the optimal numerical value is used as appropriate for the material. The measurement of the atom content of each atom in each area from the surface of the protective layer in the thickness direction using the etching and ESCA was repeatedly performed and the atom content of each atom in each area from the surface of the protective layer in the thickness direction was obtained.

In a case where the second protective layer including the compound having a siloxane bond is provided on the protective layer, the atom content of each atom in each area from the surface of the protective layer in the thickness direction (the interface between the protective layer and the second protective layer) was obtained in the same manner as in the calculation of the atom content of each atom of the protective layer.

The average value of the atom content of each atom in each area from the surface of the protective layer in the thickness direction (the average value in the thickness direction) was obtained. From the obtained results, the followings were calculated:

(1) silicon atom content of protective layer;
(2) fluorine atom content;
(3) total of contents of carbon atom, hydrogen atom, nitrogen atom, and oxygen atom; and
(4) total of contents of carbon atom, hydrogen atom, nitrogen atom, oxygen atom and halogen atom.

These results are shown in Table 1 below.

<Insolubility of Protective Layer in Organic Solvent>

For each gas separation membrane of each of Examples and Comparative Example, a sample piece having a separation layer sectioned by freezing was prepared.

Etching and ESCA were alternately performed on the test piece before immersion in a solvent containing toluene and heptane for 1 day, and the F/C ratio and the intensity of the fluorine atom in x-ray fluorescence (XRF) analysis were measured.

The sample piece was immersed in an organic solvent containing toluene and heptane at a compositional ratio of 1:1 by mass ratio for 1 day.

Then, etching and ESCA were alternately performed on the surface of the protective layer opposite to the separation layer to measure the F/C ratio and the intensity of the fluorine atom in x-ray fluorescence (XRF) analysis of the surface of the protective layer opposite to the separation layer.

The intensity of the fluorine atom in the x-ray fluorescence (XRF) analysis of the surface of the protective layer was measured in the following method.

The XRF intensity in the present invention indicates a value measured by the following method.

The amount of F atoms (F $mg/m^2$) is measured by a calibration curve method using an X-ray fluorescence spectrometer (XRF). The type of the X-ray fluorescence spectrometer is not particularly limited, but in the present invention, the amount of F atoms is adopted under the following conditions using RIX 3000 manufactured by Rigaku Denki Kogyo Kabushiki Kaisha.

Device: RIX3000 manufactured by Rigaku Denki Kogyo Kabushiki Kaisha

X-ray tube: Rh, Tube voltage: 50 kV, Tube current: 50 mA, Slit: COARSE, Analyzing crystal: RX4, Detector: F-PC, Analyzed area: diameter of 30 mm, Background (2θ): 140.70 deg., 146.85 deg., Integration time: 80 sec/sample The insolubility of the protective layer in the organic solvent was evaluated based on the following standards using the measurement results of the variation of the F/C ratio and the variation of the intensity of the fluorine atom in the fluorescent X-ray analysis.

A: Insoluble in the organic solvent (both of the variation of the F/C ratio of the surface of the protective layer opposite to the separation layer and the variation of the intensity of the fluorine atom in the fluorescence X-ray analysis of the surface of the protective layer opposite to the separation layer before and after immersion in the organic solvent containing toluene and heptane at a compositional ratio of 1:1 by mass ratio for 1 day were less than 30%).

C: Soluble in the organic solvent (at least one of the variation of the F/C ratio of the surface of the protective layer opposite to the separation layer and the variation of the intensity of the fluorine atom in the fluorescence X-ray analysis of the surface of the protective layer opposite to the separation layer before and after immersion in the organic solvent containing toluene and heptane at a compositional ratio of 1:1 by mass ratio for 1 day was 30% or more).

The obtained results are shown in Table 1 below. The insolubility of the separation layer in the organic solvent was similarly evaluated for the three kinds of an organic solvent constituted of toluene, an organic solvent constituted of heptane, and an organic solvent constituted of methyl ethyl ketone. As a result, the evaluation results were the same as in a case of using an organic solvent containing toluene and heptane at a compositional ratio of 1:1.

Example 1

<Formation of Protective Layer>

PETA (trade name, ARONIX M-305, manufactured by TOAGOSEI CO., LTD., mixture of pentaerythritol triacrylate and pentaerythritol tetraacrylate) and a polymerization initiator IRGACURE 127 (manufactured by BASF SE, abbreviated as Irg 127) were dissolved in a heptane solvent such that the concentration of solid contents of the polymerization initiator with respect to PETA became 3% by mass, and thus a composition for forming a protective layer was prepared.

The composition for forming a protective layer was applied to the separation layer obtained in Comparative Example 1 such that the thickness of the protective layer became 40 nm.

Then, the composition for forming a protective layer was crosslinked under the conditions of a UV intensity of 24 kW/m for a treatment time of 10 seconds, (Light Hammer 10, manufactured by Fusion UV System Corporation, D-VALVE) and a protective layer having a thickness of 40 nm was laminated.

<Formation of Second Protective Layer>

Thereafter, the polymerizable radiation curable composition used for forming the resin layer in Comparative Example 1 was applied to the protective layer, then a UV treatment was performed under the same UV treatment conditions as in the formation of the resin layer UV, and a second protective layer having a thickness of 600 nm was formed on the protective layer, and dried at 50° C.

The composite membrane having the support, the resin layer, the separation layer, the protective layer, and the second protective layer obtained was used as a gas separation membrane of Example 1.

With respect to the obtained gas separation membrane of Example 1, the maximum value of the silicon atom content in the composition of the half area of the separation layer on the protective layer side and the composition of the protective layer were measured in the same manner as in Comparative Example 1 and were shown in Table 1 below.

Examples 2 to 9

Gas separation membranes of each of Examples were prepared in the same manner as in Example 1 except that the resin or monomer of the protective layer, the kind of polymerization initiator and the concentration of solid contents thereof, and the thickness of the protective layer in Example 1 were changed as shown in Table 1 below.

However, in Example 9 in which the polymerization initiator was not used, a crosslinking reaction was not conducted.

<Resin or Monomer of Protective Layer>

TMPTA (trade name, ARONIX M-309, manufactured by TOAGOSEI CO., LTD., trimethylolpropane triacrylate)

LINC-3A (manufactured by KYOEISHA CHEMICAL Co., Ltd., fluoro(meth)acrylate as triacryloylheptadecafluorononenyl pentaerythritol)

BR-30 (trade name, NEW FRONTIER BR-30, manufactured by Dai-ichi Kogyo Seiyaku Co., Ltd., tribromophenyl acrylate)

FLUONATE (trade name, FLUONATE K-704, manufactured by DIC Corporation, hydroxyl group-containing fluoroolefin polymer)

<Polymerization Initiator of Protective Layer>

BURNOCK DN-980 (polyisocyanate prepolymer:solid content=75% by mass, manufactured by DIC Corporation, also referred to as a curing agent)

[Evaluation]

<Gas Permeability>

The gas permeability of the gas separation membrane of each of Examples and Comparative Example was evaluated using a SUS316 STAINLESS STEEL CELL (manufactured by DENISSEN Ltd.) having high pressure resistance by adjusting the cell temperature to 30° C. The respective gas permeabilities of $CO_2$ and $CH_4$ were measured by TCD detection type gas chromatography by adjusting the total pressure on the gas supply side of a mixed gas, in which the volume ratio of carbon dioxide ($CO_2$) to methane ($CH_4$) was set to 6:94, to 5 MPa (partial pressure of $CO_2$: 0.65 MPa). The gas permeability of $CO_2$ of the gas separation membrane of each of Examples and Comparative Example was set as permeability $Q_{CO2}$ (unit: GPU) of $CO_2$ of this membrane.

In addition, the unit of gas permeability was expressed by the unit of GPU [1 GPU=$1 \times 10^{-6}$ cm$^3$(STP)/cm$^2$·sec·cmHg] representing the permeation flux (also referred to as permeation rate, permeability, and Permeance) per pressure difference or the unit of barrer [1 barrer=$1 \times 10^{-10}$ cm$^3$(STP) ·cm/cm$^2$·sec·cmHg] representing the permeability coefficient. In the present specification, the symbol Q is used to represent a case of the unit of GPU and the symbol P is used to represent a case of the unit of barrer.

Based on the results of the measured $CO_2$ permeability, the gas permeability of the gas separation membrane of each of Examples and Comparative Example was evaluated according to the following standards.

A: The $CO_2$ permeability was decreased by less than 20% compared to Comparative Example 1.

B: The $CO_2$ permeability was decreased by 20% or more and less than 50% compared to Comparative Example 1.

C: The $CO_2$ permeability was decreased by 50% or more and less than 80% compared to Comparative Example 1.

D: The $CO_2$ permeability was decreased by 80% or more compared to Comparative Example 1.

The obtained results are shown in Table 1 below.

<Variation in C3 Gas Separation Selectivity>

The C3 gas separation selectivity was measured in the same manner as in the evaluation of the gas permeability except that as the evaluation gas, a mixed gas including 3% by volume of propane as C3 gas, 84% by volume of $CH_4$, and 13% by volume of $CO_2$ as a composition, was used. The C3 gas separation selectivity was calculated as a ratio ($P_{CO2}/P_{C3}$) of a permeability coefficient $P_{CO2}$ of $CO_2$ to a permeability coefficient $P_{C3}$ of propane as C3 gas of the gas separation membrane.

10 samples of each of the gas separation membranes of respective Examples and Comparative Example were prepared and the C3 gas separation selectivity of each sample was measured.

Variation in C3 gas separation selectivity of the gas separation membrane of each of Examples and Comparative Example was evaluated based on the following standards.

A: In C3 gas separation selectivity at the time of measurement of 10 samples, both a value of (maximum value−median)/median×100% and a value of (minimum value−median)/median×100% are within ±50%. Here, the median is the fifth value from the maximum value at the time of measurement of 10 samples.

B: In C3 gas separation selectivity at the time of measurement of 10 samples, at least one of a value of (maximum value–median)/median×100% or a value of (minimum value–median)/median×100% is more than ±50%.

The obtained results are shown in Table 1 below.

<Rub Resistance>

The gas separation membrane of each of Examples and Comparative Example was tested for rub resistance by the following method and evaluated according to the following standards.

An operation of putting BEMCOT on a 5 cm square sample, putting a 300 g weight thereon, and moving the BEMCOT on the sample by pulling the BEMCOT was set to one rubbing operation.

Before and after the rubbing treatment, microscope observation and gas permeability evaluation were performed. In a case where the occurrence of scratches was confirmed by a microscope, and the selectivity was reduced by 50% or more, it was determined that a defect was generated.

A: No defect was generated when the sample was rubbed with BEMCOT (trade name: BEMCOT M-3, manufactured by Asahi Kasei Corporation) 10 times or more.

B: No defect was generated when the sample was rubbed with BEMCOT 3 times and a defect was generated when the sample was rubbed with BEMCOT 4 to 9 times.

C: A defect was generated when the sample was rubbed with BEMCOT 3 times.

The term "defect" in the test refers to the fact that the selectivity was more than twice as high as that before rubbing treatment.

The obtained results are shown in Table 1 below.

<Adhesion>

The gas separation membrane of each of Examples and Comparative Example was subjected to a tape adhesion test and a cross cut test in the following manners to evaluate the adhesion.

The tape adhesion test was performed in the following manner.

An invisible adhesive tape manufactured by Staples Inc. was floated only at the edge of the tape and attached to the membrane surface. The edge of the tape was pulled in a 180° direction and peeled off. At this time, evaluation was made based on whether or not a peeling site was generated on the membrane surface.

The cross cut test was performed according to the Japanese industrial standards (JIS)-K5600. Cutting was made at a depth reaching from the protective layer to the separation layer of the gas separation membrane with a width of 1 mm and peeling was performed with a pressure sensitive adhesive tape (CELLOTAPE (registered trademark) CT-24 manufactured by Nichiban Co., Ltd.). Among 100 masses, the number of remaining masses (residual mass number) without peeling by the pressure sensitive adhesive tape was measured to evaluate the adhesion.

A: Peeling does not occur in the tape adhesion test and the cross cut test.

B: Peeling does not occur in the tape adhesion test but peeling occurs in 1 to 100 masses in the cross cut test.

C: Peeling occurs in the tape adhesion test and peeling occurs in 100 masses in the cross cut test.

The peeling occurred between the protective layer and the separation layer.

The obtained results are shown in Table 1.

<Toluene Separation Selectivity>

The toluene permeability was obtained for the gas separation membrane of each of Examples and Comparative Example by a cup method, and further, the toluene separation selectivity was evaluated. Specifically, a permeability coefficient $P_{C7H8}$ of toluene and a permeability coefficient $P_{CO2}$ of $CO_2$ were obtained using a mixed gas in which the volume ratio of toluene ($C_7H_8$), carbon dioxide ($CO_2$), and methane ($CH_4$) was 0.1:13:86.9 in the following manner.

The toluene separation selectivity was calculated as a ratio ($P_{CO2}/P_{C7H8}$) of the permeability coefficient $P_{CO2}$ of $CO_2$ to the permeability coefficient $P_{C7H8}$ of toluene of this membrane. Based on the calculated toluene separation selectivity results, the toluene separation selectivity of the gas separation membrane of each of Examples and Comparative Example was evaluated according to the following standards. The $CO_2$ separation membrane preferably increases the purification efficiency of natural gas by allowing selective permeation of $CO_2$ and not allowing permeation of other gases. Therefore, it is desirable that the toluene permeability is low, that is, the higher the toluene separation selectivity is, the more preferable it is.

A: The toluene separation selectivity is high compared to Comparative Example 1.

B: The toluene separation selectivity is same as in Comparative Example 1 or the toluene separation selectivity is low compared to Comparative Example 1.

The obtained results are shown in Table 1.

TABLE 1

| | | Comparative Example 1 | Example 1 | Example 2 | Example 3 | Example 4 | Example 5 |
|---|---|---|---|---|---|---|---|
| Support | | Provided | Provided | Provided | Provided | Provided | Provided |
| Resin layer | Resin | PDMS | PDMS | PDMS | PDMS | POMS | POMS |
| Separation layer | Maximum value of silicon atom content in composition of half area on protective layer side | More than 2 atomic % | 2 atomic % or less | 2 atomic % or less | 2 atomic % or less | 2 atomic % or less | 2 atomic % or less |
| Protective layer | Resin or monomer | PDMS | PETA | TMPTA | LINC-3A | Br-30 | FLUONATE |
| | Polymerization initiator | PAG | Irg 127 | Irg 127 | Irg 127 | Irg 127 | BURNOCK DN-980 |
| | Concentration of solid contents of polymerization initiator [% by mass] | 3 | 3 | 3 | 3 | 3 | 20 |
| | Thickness | 600 nm | 40 nm | 40 nm | 40 nm | 40 nm | 70 nm |
| | Silicon atom content | More than 5 atomic % | 5 atomic % or less | 5 atomic % or less | 5 atomic % or less | 5 atomic % or less | 5 atomic % or less |
| | Fluorine atom content | 0 atomic % | 0 atomic % | 0 atomic % | 10 atomic % or more | 10 atomic % or more | 10 atomic % or more |
| | Total of contents of carbon atom, hydrogen atom, nitrogen atom, and oxygen atom | Less than 90 atomic % | 90 atomic % or more | 90 atomic % or more | Less than 90 atomic % | Less than 90 atomic % | Less than 90 atomic % |

TABLE 1-continued

|  |  |  |  |  |  |  |  |  |
|---|---|---|---|---|---|---|---|---|
|  | Total of contents of carbon atom, hydrogen atom, nitrogen atom, oxygen atom and halogen atom | Less than 90 atomic | 90 atomic % or more | 90 atomic % or more | 90 atomic % or more | 90 atomic % or more | 90 atomic % or more |  |
|  | Insolubility in organic solvent | C | A | A | A | A | A |  |
| Second protective layer | Resin | None | PDMS | PDMS | PDMS | PDMS | PDMS |  |
| Evaluation | Gas permeability | — | C | C | B | C | C |  |
|  | Variation in C3 gas Separation selectivity | B | A | A | A | A | A |  |
|  | Rub resistance | C | A | A | A | A | A |  |
|  | Adhesion | C | A | A | A | A | A |  |
|  | Toluene separation selectivity | — | A | A | B | B | B |  |

|  |  |  | Example 6 | Example 7 | Example 8 | Example 9 |
|---|---|---|---|---|---|---|
|  | Support |  | Provided | Provided | Provided | Provided |
|  | Resin layer | Resin | PDMS | PDMS | PDMS | PDMS |
|  | Separation layer | Maximum value of silicon atom content in composition of half area on protective layer side | 2 atomic % or less | 2 atomic % or less | 2 atomic % or less | 2 atomic % or less |
|  | Protective layer | Resin or monomer | FLUONATE | FLUONATE | FLUONATE | FLUONATE |
|  |  | Polymerization initiator | BURNOCK DN-980 | BURNOCK DN-980 | BURNOCK DN-980 | None |
|  |  | Concentration of solid contents of polymerization initiator [% by mass] | 10 | 3 | 1 | — |
|  |  | Thickness | 70 nm | 70 nm | 70 nm | 70 nm |
|  |  | Silicon atom content | 5 atomic % or less | 5 atomic % or less | 5 atomic % or less | 5 atomic % or less |
|  |  | Fluorine atom content | 10 atomic % or more | 10 atomic % or more | 10 atomic % or more | 10 atomic % or more |
|  |  | Total of contents of carbon atom, hydrogen atom, nitrogen atom, and oxygen atom | Less than 90 atomic % | Less than 90 atomic % | Less than 90 atomic % | Less than 90 atomic % |
|  |  | Total of contents of carbon atom, hydrogen atom, nitrogen atom, oxygen atom and halogen atom | 90 atomic % or more | 90 atomic % or more | 90 atomic % or more | 90 atomic % or more |
|  |  | Insolubility in organic solvent | A | A | A | C |
|  | Second protective layer | Resin | POMS | PDMS | PDMS | PDMS |
|  | Evaluation | Gas permeability | A | A | A | A |
|  |  | Variation in C3 gas Separation selectivity | A | A | A | A |
|  |  | Rub resistance | A | A | A | B |
|  |  | Adhesion | A | A | A | B |
|  |  | Toluene separation selectivity | B | B | B | B |

From Table 1 above, it was found that in the gas separation membrane of the present invention, variation in C3 gas separation selectivity was small. The rub resistance of the three-dimensionally crosslinked membranes of Examples 1 to 8 in which the polymerization initiator was used and which were insoluble in the organic solvent was greatly improved compared with the membrane of Example 9 dissoluble in the organic solvent. In addition, in Examples 5 to 8 in which the polymerization initiator (a curing agent which is an isocyanate) was used, the adhesion was satisfactory compared to Example 9 in which the polymerization initiator was not used.

On the other hand, from Comparative Example 1, it was found that in a case where the maximum value of the silicon atom content in the composition of the half area of the separation layer on the protective layer side in the thickness direction was greater than the upper limit defined in the present invention, variation in C3 gas separation selectivity was large.

—Made into Modules—

Spiral type modules were prepared using the gas separation membranes prepared in Examples 1 to 9 with reference to paragraphs <0012> to <0017> of JP1993-168869A (JP-H05-168869A).

It was confirmed that the prepared gas separation membrane modules of the respective Examples were excellent based on the performance of the gas separation membrane incorporated therein.

In the prepared gas separation membrane modules of the respective Examples, ten portions having a size of 1 cm×1 cm were randomly collected from the center of one surface of a leaf (leaf indicates a portion of a gas separation membrane in which the space on the permeation side in the spiral type module is connected to the central tube and which is folded into an envelope shape) with a size of 10 cm×10 cm and the element ratios of the surface in the depth direction were calculated according to the method of Example 1, and then the modules were confirmed to have the performance as understood from the separation membranes incorporated therein based on nine or more out of ten portions. It was confirmed that the spiral type modules were excellent as the performance of the gas separation membranes incorporated therein.

EXPLANATION OF REFERENCES

2: resin layer
3: separation layer
4: support
6: interface between separation layer and protective layer
7: half of separation layer on protective layer side from separation layer surface
8: protective layer
10: gas separation membrane
d: half area of separation layer on protective layer side

What is claimed is:
1. A gas separation membrane comprising, in order:
a support;
a resin layer;
a separation layer; and
a protective layer,
wherein the resin layer includes a compound having a siloxane bond,
the protective layer is in direct contact with the separation layer,
a composition of the protective layer is different from a composition of the resin layer,
the composition of the protective layer is different from a composition of the separation layer,
the separation layer has a maximum value of a silicon atom content of 2 atomic % or less in a composition of a half area on a side of the protective layer in a thickness direction,
the protective layer includes a resin obtained by polymerization and/or crosslinking of at least one monomer selected from a fluoroepoxy monomer, a fluoroolefin monomer, a fluoro(meth)acrylate monomer, and a bromo(meth)acrylate monomer,
the separation layer includes a resin, and the resin of the separation layer is polyimide having at least a repeating unit according to formula (I),

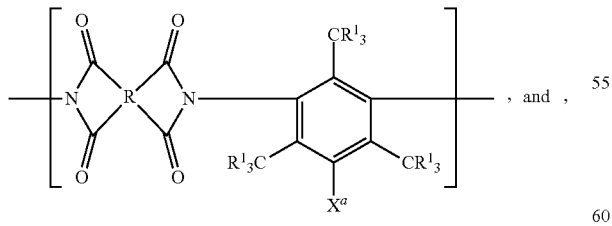

(I)

in Formula (I),
R$^1$ represents a hydrogen atom, an alkyl group, or a halogen atom,
X$^a$ represents a polar group selected from a sulfonamide group, an alkoxysulfonyl group, a carboxyl group, a hydroxyl group, an acyloxy group and a halogen atom,
R represents a group having a structure represented by any one of Formulae (I-1) to (I-28),

(I-1)

(I-2)

(I-3)

(I-4)

(I-5)

(I-6)

(I-7)

(I-8)

(I-9)

(I-10)

(I-11)

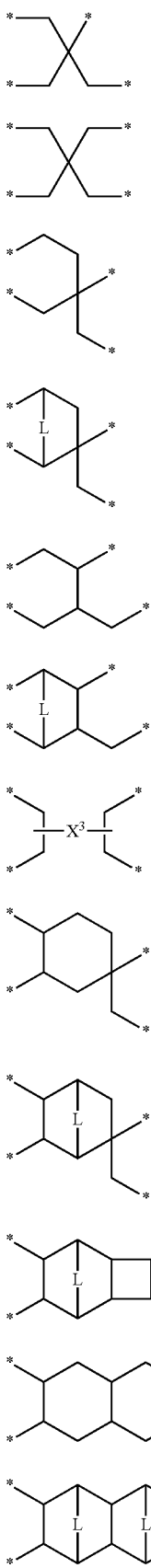

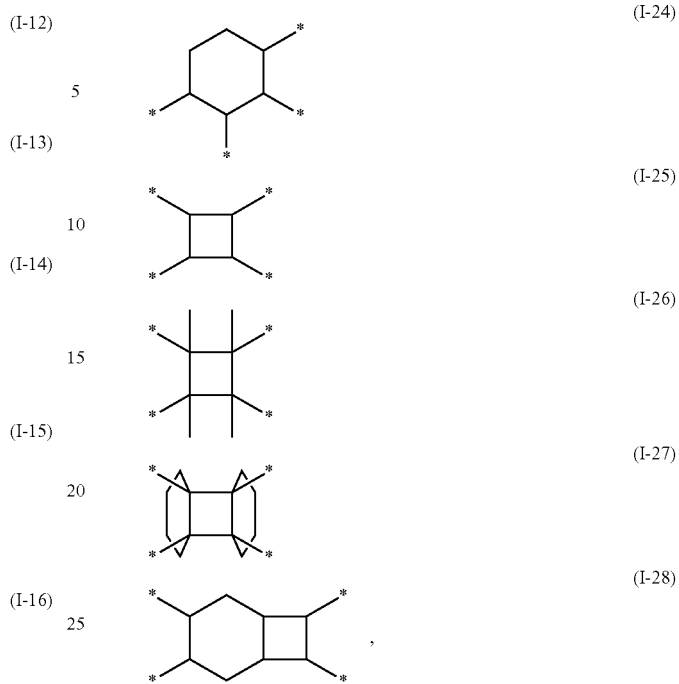

where $X^1$ to $X^3$ each represent a single bond or a divalent linking group,

L represents —CH=CH— or —CH$_2$—, $R^1$ and $R^2$ each represent a hydrogen atom or a substituent, and * represents a bonding site with a carbonyl group in Formula (I).

2. The gas separation membrane according to claim 1, wherein the protective layer has a silicon atom content of 5 atomic % or less.

3. The gas separation membrane according to claim 1, wherein 90 atomic % or more of the composition of the protective layer is constituted of a carbon atom, a hydrogen atom, a nitrogen atom, and an oxygen atom.

4. The gas separation membrane according to claim 2, wherein 90 atomic % or more of the composition of the protective layer is constituted of a carbon atom, a hydrogen atom, a nitrogen atom, and an oxygen atom.

5. The gas separation membrane according to claim 1, wherein 90 atomic % or more of the composition of the protective layer is constituted of a carbon atom, a hydrogen atom, a nitrogen atom, an oxygen atom, and a halogen atom.

6. The gas separation membrane according to claim 2, wherein 90 atomic % or more of the composition of the protective layer is constituted of a carbon atom, a hydrogen atom, a nitrogen atom, an oxygen atom, and a halogen atom.

7. The gas separation membrane according to claim 3, wherein 90 atomic % or more of the composition of the protective layer is constituted of a carbon atom, a hydrogen atom, a nitrogen atom, an oxygen atom, and a halogen atom.

8. The gas separation membrane according to claim 5, wherein the halogen atom is a fluorine atom, and a fluorine atom content in the composition of the protective layer is 10 atomic % or more.

9. The gas separation membrane according to claim 1, wherein
the protective layer includes at least one selected from the group of a fluoro(meth)acrylate polymer and a fluoroolefin polymer as the resin of the protective layer.

10. The gas separation membrane according to claim 1, wherein
the resin of the protective layer includes at least one selected from the group of an acrylic ester bond, a methacrylic ester bond, a urethane bond, and an ether bond.

11. The gas separation membrane according to claim 1, wherein the protective layer has a thickness of 20 to 200 nm.

12. The gas separation membrane according to claim 1, wherein the protective layer is insoluble in an organic solvent consisting of toluene and heptane at a compositional ratio of 1:1 by mass ratio.

13. The gas separation membrane according to claim 2, wherein the protective layer is insoluble in an organic solvent consisting of toluene and heptane at a compositional ratio of 1:1 by mass ratio.

14. The gas separation membrane according to claim 3, wherein the protective layer is insoluble in an organic solvent consisting of toluene and heptane at a compositional ratio of 1:1 by mass ratio.

15. The gas separation membrane according to claim 1, wherein the compound having a siloxane bond of the resin layer is polydimethylsiloxane.

16. The gas separation membrane according to claim 1, wherein the resin of the protective layer is obtained by polymerization and/or cross-linking of at least a bromo(meth)acrylate monomer according to Formula (1) or (2), $$(C_pF_q-O-)_r-A-(-O-CO-CR=CH_2)_s \quad \text{Formula (1)},$$

$$(C_pF_q-O-)_r-A(OH)_t-(-O-CO-CR=CH_2)_{s-t} \quad \text{Formula (2)},$$

in Formula (1), p represents an integer of 1 to 18, q represents an integer of 3 to 37, r represents an integer of 1 to 18, s represents an integer of 2 to 19, r+s is 3 to 20, A represents a dehydroxylated residue of a polyhydric alcohol, and R represents a hydrogen atom or a methyl group, and, in Formula (2), p represents an integer of 1 to 18, q represents an integer of 3 to 37, r represents an integer of 1 to 18, s represents an integer of 2 to 19, t represents an integer of 1 to 18, where r+s is 3 to 20, and s>t, A represents a dehydroxylated residue of a polyhydric alcohol, and R represents a hydrogen atom or a methyl group.

17. The gas separation membrane according to claim 1 further comprising:
a second protective layer,
wherein the support, the resin layer, the separation layer, the protective layer, and the second protective layer are provided in this order, and
the second protective layer includes a compound having a siloxane bond.

18. The gas separation membrane according to claim 17, wherein the compound having a siloxane bond of the second protective layer is polydimethylsiloxane.

19. A gas separation membrane module comprising:
the gas separation membrane according to claim 1.

20. A gas separation device comprising:
the gas separation membrane module according to claim 19.

* * * * *